(12) United States Patent
Lee et al.

(10) Patent No.: US 12,269,312 B2
(45) Date of Patent: Apr. 8, 2025

(54) HEAT MANAGEMENT DEVICE FOR VEHICLE, AND HEAT MANAGEMENT METHOD FOR VEHICLE

(71) Applicant: Hanon Systems, Daejeon (KR)

(72) Inventors: Jae Min Lee, Daejeon (KR); Young Chul Kim, Daejeon (KR); In Hyeok Kim, Daejeon (KR); Kyeong Cheol Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 268 days.

(21) Appl. No.: 17/625,000

(22) PCT Filed: Jul. 15, 2020

(86) PCT No.: PCT/KR2020/009314
§ 371 (c)(1),
(2) Date: Jan. 5, 2022

(87) PCT Pub. No.: WO2021/015483
PCT Pub. Date: Jan. 28, 2021

(65) Prior Publication Data
US 2022/0258558 A1    Aug. 18, 2022

(30) Foreign Application Priority Data
Jul. 22, 2019   (KR) .................. 10-2019-0088250

(51) Int. Cl.
*B60H 1/00*   (2006.01)
*B60H 1/14*   (2006.01)
(Continued)

(52) U.S. Cl.
CPC ......... *B60H 1/00278* (2013.01); *B60H 1/143* (2013.01); *B60H 1/32* (2013.01);
(Continued)

(58) Field of Classification Search
CPC ........................ B60H 1/143; B60H 1/00278
See application file for complete search history.

(56) References Cited

U.S. PATENT DOCUMENTS

| | | |
|---|---|---|
| 2010/0012295 A1 | 1/2010 | Nemesh et al. |
| 2016/0107505 A1 | 4/2016 | Johnston |
| 2018/0208014 A1* | 7/2018 | Ben Ahmed ......... B60H 1/3211 |

FOREIGN PATENT DOCUMENTS

| | | |
|---|---|---|
| CN | 105196832 A | 12/2015 |
| KR | 20130101254 A | 9/2013 |

(Continued)

OTHER PUBLICATIONS

Office Action issued on May 24, 2024 by the CIPO in the corresponding Patent Application No. 202080053051.4, with English translation.

*Primary Examiner* — Schyler S Sanks
(74) *Attorney, Agent, or Firm* — Norton Rose Fulbright US LLP; James R. Crawford

(57) ABSTRACT

An embodiment relates to a heat management device for a vehicle and a heat management method for a vehicle, which use a branch line and a flow control means to use heat generated from a battery module of a vehicle or a heat generated from an electrical component of the vehicle as a heat source for an air conditioning device installed in the vehicle. Therefore, the heat management device for a vehicle and the heat management method for a vehicle may improve heating performance and quality by selectively using waste heat from the electrical component module and the waste heat from the battery depending on the mode.

16 Claims, 15 Drawing Sheets

(51) Int. Cl.
*B60H 1/32* (2006.01)
*B60H 3/02* (2006.01)
(52) U.S. Cl.
CPC .............. *B60H 2001/00307* (2013.01); *B60H 1/00885* (2013.01); *B60H 3/024* (2013.01)

(56) References Cited

FOREIGN PATENT DOCUMENTS

| | | |
|---|---|---|
| KR | 101875651 B1 | 7/2018 |
| KR | 20190057769 A | 5/2019 |

\* cited by examiner

ABSTRACT# HEAT MANAGEMENT DEVICE FOR VEHICLE, AND HEAT MANAGEMENT METHOD FOR VEHICLE

CROSS REFERENCE TO RELATED APPLICATIONS

This application is a national phase under 35 U.S.C. § 371 of International Application No. PCT/KR2020/009314 filed on Jul. 15, 2020, which claims the benefit of priority from Korean Patent Application No. 10-2019-0088250 filed on Jul. 22, 2019. The entire contents of these applications are incorporated herein by reference in their entirety.

TECHNICAL FIELD

An embodiment relates to a heat management device for a vehicle and a heat management method for a vehicle. More particularly, an embodiment relates to a heat management device for a vehicle and a heat management method for a vehicle, in which a heating heat source of an air conditioning device installed in a vehicle ensures heat generated by a battery module of the vehicle or heat generated by electrical components.

BACKGROUND ART

A vehicle is equipped with an air conditioning device for adjusting an air temperature in the interior of the vehicle. The air conditioning device produces warm air to keep the interior of the vehicle warm or produces cold air to keep the interior of the vehicle cool. In this case, the air conditioning device for a vehicle may include a compressor, a condenser, an expansion valve, an evaporator, and pipes connecting these components for circulating a refrigerant.

Most vehicles equipped with such air conditioning devices use internal combustion engines that operate using fossil fuel such as gasoline or light oil as an energy source. Therefore, there is an increasing need for a new energy source because of various causes such as environmental pollution, a reduction in oil reserves, or the like. Therefore, environmentally-friendly vehicles such as electric vehicles and fuel cell vehicles attract interest.

The vehicle using the internal combustion engine (hereinafter, referred to as an 'internal combustion engine vehicle') may heat the interior of the vehicle using a coolant that cools the internal combustion engine. For example, the internal combustion engine vehicle is equipped with a heating system that uses the coolant for absorbing heat from the internal combustion engine and using the heat to heat the interior of the vehicle, thereby heating the interior of the vehicle.

However, because the vehicle using a fuel cell or the like does not use the internal combustion engine, there is a problem in that the vehicle using the fuel cell or the like cannot use the heating system that uses the internal combustion engine of the vehicle as a heat source.

Therefore, the air conditioning device of the vehicle using the fuel cell or the like is additionally equipped with a heat pump and uses the heat pump as a heat source. Alternatively, the vehicle using the fuel cell or the like is equipped with a separate heat source such as an electric heater to heat the interior of the vehicle. However, when only heat generated by electrical components is used as a heat source of the heat pump, there is a problem in that the performance in heating the interior of the vehicle deteriorates when the vehicle travels at a low speed or when the vehicle operates after the vehicle is stopped for a long period of time. For this reason, a separate PTC (positive temperature coefficient) heater needs to be installed and used in the vehicle, which causes a problem in that the amount of electric power consumed in the vehicle increases.

DISCLOSURE

Technical Problem

An embodiment provides a heat management device for a vehicle and a heat management method for a vehicle, which selectively use waste heat from an electrical component module and waste heat of a battery in accordance with a mode for heating an interior of a vehicle, thereby improving heating performance and quality.

Another embodiment provides a heat management device for a vehicle and a heat management method for a vehicle, in which a refrigerant circulation structure of an air conditioning device is disposed in a structure in which separate coolant circulation structures are separately disposed to cool an electrical component module and a battery, thereby selectively using waste heat from the electrical component module and waste heat of the battery.

Still another embodiment provides a heat management device for a vehicle and a heat management method for a vehicle, which are capable of dehumidifying an interior of a vehicle while heating the interior of the vehicle.

Yet another embodiment provides a heat management device for a vehicle and a heat management method for a vehicle, in which a branch line is disposed to bypass an external heat exchanger to dehumidify an interior of a vehicle while heating the interior of the vehicle, and a chiller disposed in the branch line is used to sufficiently cool a battery. That is, the embodiment provides a heat management device for a vehicle and a heat management method for a vehicle, which are capable of ensuring performance in cooling a battery by supplying a refrigerant with a minimized pressure drop to a chiller for cooling a battery while allowing the refrigerant to bypass an external heat exchanger.

Still yet another embodiment provides a heat management device for a vehicle and a heat management method for a vehicle, which supply a heat exchange medium to a chiller for cooling an electrical component module while allowing the heat exchange medium to bypass an external heat exchanger in a situation in which moisture is attached to the external heat exchanger or an outside atmospheric temperature is very low.

Technical problems to be solved by the embodiment are not limited to the above-mentioned technical problems, and other technical problems, which are not mentioned above, may be clearly understood by those skilled in the art from the following descriptions.

Technical Solution

The above-mentioned objects are achieved by a heat management device for a vehicle, the heat management device including: a battery cooling device configured to cool a battery by using a second heat exchange medium; an air conditioning device configured to adjust a temperature of an interior of a vehicle by using a third heat exchange medium; and a second waste heat recovery chiller configured to allow the second heat exchange medium and the third heat exchange medium to exchange heat with each other, in which the air conditioning device includes: an air conditioning line configured to connect a compressor, a heat dissipation unit, an external heat exchanger, a first expansion means, and an evaporator; a branch line connected to the air conditioning line so that the third heat exchange medium bypasses the external heat exchanger; and a flow control means, and in which the flow control means performs control so that the third heat exchange medium flows to the evaporator or the second waste heat recovery chiller through the branch line.

In addition, the heat management device may further include an electrical component cooling device configured to cool an electrical component module by using a first heat exchange medium; and a first waste heat recovery chiller configured to allow the first heat exchange medium and the third heat exchange medium to exchange heat with each other. In this case, the flow control means may perform control so that the third heat exchange medium flows to the first waste heat recovery chiller through the branch line.

Further, the branch line may include: a first branch line connected to the air conditioning line; a second branch line branching off from the first branch line and disposed to pass through the first waste heat recovery chiller; and a third branch line branching off from the first branch line and disposed to pass through the second waste heat recovery chiller, and in which the flow control means includes: a first 3-way valve disposed at a first branch point P1 at which the air conditioning line and the first branch line meet; and a second 3-way valve disposed in the third branch line.

Further, one side of the first branch line may be connected to the air conditioning line between the heat dissipation unit and the external heat exchanger.

Meanwhile, in a cooling mode of the heat management device for a vehicle, the first 3-way valve may allow the third heat exchange medium to flow to the external heat exchanger.

In addition, in a first heating mode of a heating mode of the heat management device for a vehicle, the first 3-way valve and the second 3-way valve may allow the third heat exchange medium to flow to the second branch line through the first branch line.

In addition, in a second heating mode of the heating mode of the heat management device for a vehicle, the first 3-way valve and the second 3-way valve may allow the third heat exchange medium to flow to the second branch line and the third branch line through the first branch line.

Meanwhile, the air conditioning device may further include a dehumidification line branching off from the third branch line and connected to the air conditioning line between the first expansion means and the evaporator, and the second 3-way valve may be disposed at a second branch point P2 at which the dehumidification line and the third branch line meet. Therefore, in a third heating mode of the heating mode of the heat management device for a vehicle, the first 3-way valve and the second 3-way valve may allow the third heat exchange medium to flow to the second branch line and the dehumidification line through the first branch line.

In addition, the air conditioning device may further include: a fifth branch line branching off from the air conditioning line between the external heat exchanger and the first expansion means and coupled to the second branch line; and a third 3-way valve disposed at a third branch point P3 at which the air conditioning line and the fifth branch line meet. Therefore, in a first-first heating mode of the heating mode of the heat management device for a vehicle, the first 3-way valve and the third 3-way valve may allow the third heat exchange medium passing through the external heat exchanger to flow to the first waste heat recovery chiller.

Meanwhile, the branch line may include: a first branch line connected to the air conditioning line; a second branch line branching off from the first branch line and disposed to pass through the first waste heat recovery chiller; and a third branch line branching off from the first branch line and disposed to pass through the second waste heat recovery chiller, and the flow control means may include: a first 3-way valve disposed at a first branch point P1 at which the air conditioning line and the first branch line meet; and a first 2-way valve disposed in the third branch line.

In this case, one side of the first branch line may be connected to the air conditioning line between the heat dissipation unit and the external heat exchanger.

Further, the air conditioning device may further include: a dehumidification line branching off from the third branch line and connected to the air conditioning line between the first expansion means and the evaporator; and a second 2-way valve disposed in the dehumidification line.

Therefore, in the first heating mode of the heating mode of the heat management device for a vehicle, the first 2-way valve and the second 2-way valve may be turned off.

In addition, in the second heating mode of the heating mode of the heat management device for a vehicle, the first 2-way valve may be turned on, and the second 2-way valve may be turned off.

In addition, in the third heating mode of the heating mode of the heat management device for a vehicle, the first 2-way valve may be turned off, and the second 2-way valve may be turned on.

In addition, in a fourth heating mode of the heating mode of the heat management device for a vehicle, the first 2-way valve and the second 2-way valve may be turned on.

Meanwhile, the air conditioning device may further include: a fifth branch line branching off from the air conditioning line between the external heat exchanger and the first expansion means and coupled to the second branch line; and a third 3-way valve disposed at a third branch point P3 at which the air conditioning line and the fifth branch line meet. Therefore, in the first-first heating mode of the heating mode of the heat management device for a vehicle, the first 3-way valve and the third 3-way valve may allow the third heat exchange medium passing through the external heat exchanger to flow to the first waste heat recovery chiller.

Meanwhile, the second branch line and the third branch line may be connected to an accumulator disposed at an inlet side of the compressor.

In addition, the air conditioning device may further include a second expansion means disposed at an inlet side of the first 3-way valve based on a flow of the third heat exchange medium.

In addition, the air conditioning device may further include a fourth branch line branching off from the air conditioning line between the external heat exchanger and the first expansion means and connected to the third branch line.

Further, the air conditioning device may further include a third expansion means disposed at an inlet side of the second waste heat recovery chiller based on the flow of the third heat exchange medium.

In this case, the first expansion means may be a mechanical expansion valve, and the third expansion means may be an electronic expansion valve.

The above-mentioned objects are achieved by a heat management device for a vehicle, the heat management device including: an electrical component cooling device capable of cooling an electrical component module PE; a battery cooling device capable of cooling a battery B; an air conditioning device configured to adjust a temperature of the interior of the vehicle; a first waste heat recovery chiller configured to allow a first heat exchange medium of the electrical component cooling device and a third heat exchange medium of the air conditioning device to exchange heat with each other; and a second waste heat recovery chiller configured to allow a second heat exchange medium of the battery cooling device and the third heat exchange medium of the air conditioning device to exchange heat with each other, in which the air conditioning device includes: an air conditioning line configured to connect a compressor, a heat dissipation unit, an external heat exchanger, a first expansion means, and an evaporator; a branch line branching off from the air conditioning line between the heat dissipation unit and the external heat exchanger and disposed to pass through the first waste heat recovery chiller and the second waste heat recovery chiller; a dehumidification line connected to the air conditioning line between the first expansion means and the evaporator and branching off from a third branch line of the branch line disposed to pass through the second waste heat recovery chiller; and a flow control means, and in which the flow control means controls the third heat exchange medium to use heat of at least any one of the electrical component cooling device and the battery cooling device as a heat source.

Meanwhile, the first heat exchange medium and the second heat exchange medium may be coolants, and the third heat exchange medium may be a refrigerant.

Advantageous Effects

According to the heat management device for a vehicle and the heat management method for a vehicle according to the embodiment, it is possible to improve the heating performance and quality by selectively using the waste heat from the electrical component module and the waste heat from the battery depending on the mode for heating the interior of the vehicle.

In detail, the refrigerant circulation structure of the air conditioning device for a vehicle is disposed in the structure in which the separate coolant circulation structures are separately disposed to cool the electrical component module and the battery to selectively use the waste heat from the electrical component module and the waste heat of the battery. Therefore, the heat management device for a vehicle may adjust the number of heat sources for heating the interior of the vehicle. That is, the heat management device for a vehicle and the heat management method for a vehicle may improve the performance in heating the interior of the vehicle by selecting the heat source depending on the heating mode.

In addition, according to the heat management device for a vehicle and the heat management method for a vehicle, the dehumidification line may be further installed in the air conditioning device and dehumidify the interior of the vehicle even during the process of heating the interior of the vehicle. Therefore, it is possible to improve the quality in heating the interior of the vehicle.

The various, beneficial advantages and effects of the embodiment are not limited to the above-mentioned contents and may be more easily understood during the process of describing the specific embodiments of the present disclosure.

DESCRIPTION OF MAIN REFERENCE NUMERALS OF DRAWINGS

Figure 1:
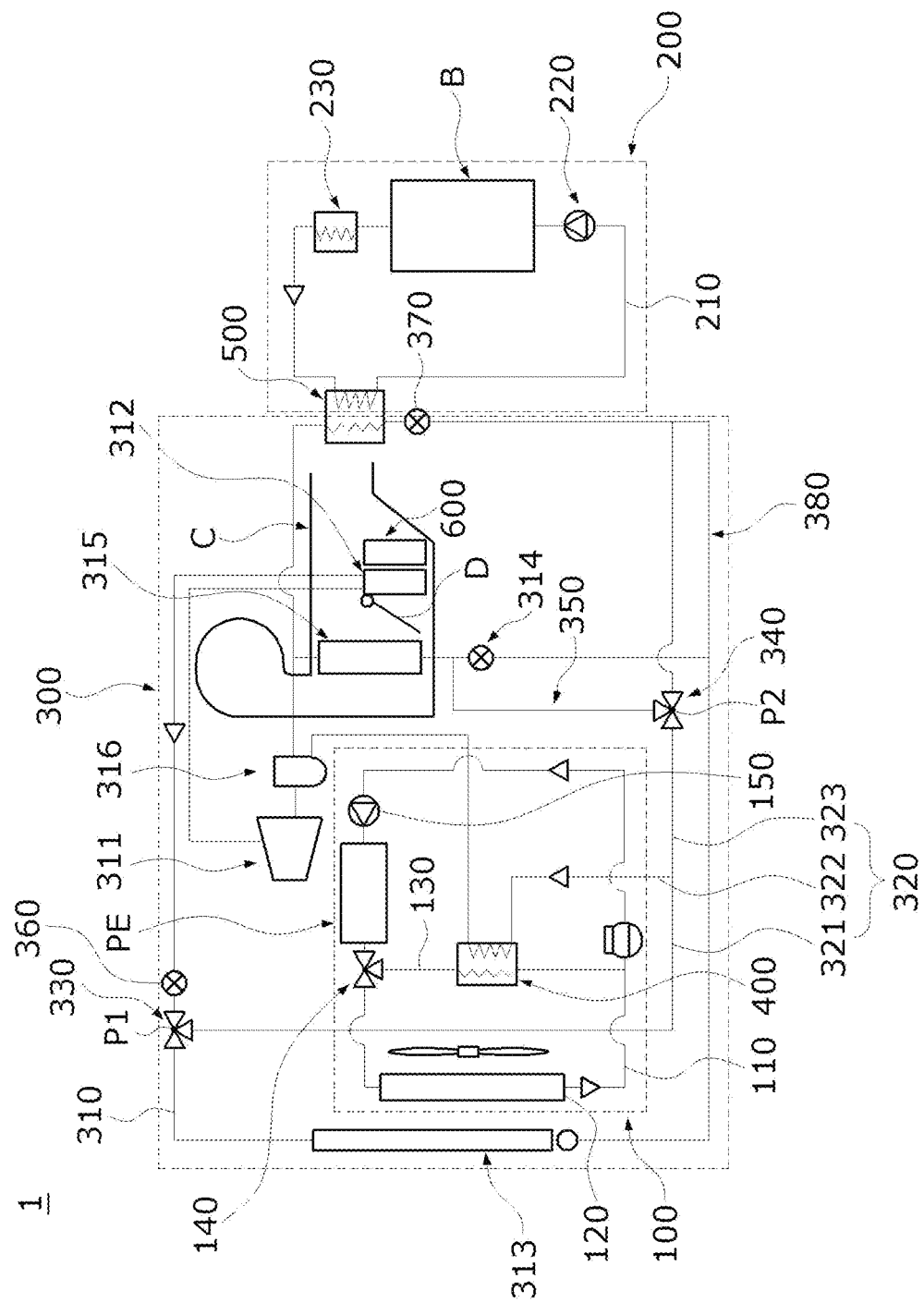
FIG. 1 is a view illustrating a heat management device for a vehicle according to a first embodiment.

1, 1a: Heat management device for vehicle
100: Electrical component cooling device
200: Battery cooling device
300, 300a: Air conditioning device
310: Air conditioning line
311: Compressor
312: Heat exchanger
313: Condenser
314: First expansion means
315: Evaporator
316: Accumulator
320: Branch line
321: First branch line
322: Second branch line
323: Third branch line
340: Second 3-way valve
341: First 2-way valve
342: Second 2-way valve
350: Dehumidification line
360: Second expansion means
370: Third expansion means
380: Fourth branch line

400: First waste heat recovery chiller
500: Second waste heat recovery chiller
600: PTC heater
B: Battery
C: Air conditioning casing
PE: Electrical component module

MODE FOR INVENTION

Hereinafter, embodiments of the present disclosure will be described with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

The vehicle may have electrical components such as a motor and an inverter. In addition, the vehicle may have electronic devices (electronics) such as a computer, a lidar, a radar, and a sensor for an autonomous driving system. Therefore, the vehicle may include an electrical component coolant circulation structure for cooling the electrical components such as the motor, the inverter, and the electronic device.

In addition, in a case in which the vehicle uses a fuel cell or the like as a driving source, the vehicle may include a separate battery coolant circulation structure capable of cooling a battery disposed in the vehicle.

Therefore, the heat management device for a vehicle according to the embodiment may improve heat management efficiency by implementing a heat pump structure disposed in an air conditioning device and capable of heating an interior of the vehicle using heat (hereinafter, referred to as 'waste heat') released from the electrical component coolant circulation structure and the battery coolant circulation structure which are separately disposed in parallel. In this case, the vehicle may be an electric vehicle, a fuel cell vehicle, or the like.

In addition, the heat management device for a vehicle according to the embodiment may improve quality in heating the interior of the vehicle by adjusting an air conditioning condition of the interior of the vehicle by selectively using waste heat from the electrical component module and waste heat from the battery in accordance with the mode for heating the interior of the vehicle.

First Embodiment

FIG. 1 is a view illustrating a heat management device for a vehicle according to a first embodiment.

Referring to FIG. 1, the heat management device 1 for a vehicle according to the embodiment may include: an electrical component cooling device 100 capable of cooling an electrical component module PE; a battery cooling device 200 capable of cooling a battery B; an air conditioning device 300 configured to adjust an air temperature of an interior of a vehicle; a first waste heat recovery chiller 400 disposed so that a first heat exchange medium of the electrical component cooling device 100 may exchange heat with a third heat exchange medium of the air conditioning device 300; and a second waste heat recovery chiller 500 disposed so that a second heat exchange medium of the battery cooling device 200 may exchange heat with the third heat exchange medium of the air conditioning device 300.

In this case, the first heat exchange medium of the electrical component cooling device 100 and the second heat exchange medium of the battery cooling device 200 respectively circulate along circulation structures separately disposed without a connection structure connecting the electrical component cooling device 100 and the battery cooling device 200. That is, the electrical component cooling device 100 and the battery cooling device 200 may be disposed in the vehicle and respectively provided in the parallel structures separately disposed.

Further, the air conditioning device 300 may adjust an air conditioning condition of the interior of the vehicle by using heat of the electrical component cooling device 100 and heat of the battery cooling device 200 as heat sources.

The electrical component cooling device 100 may cool the electrical component module PE by circulating the first heat exchange medium, thereby preventing the electrical component module PE from being overheated. Therefore, it is possible to improve the performance and lifespan of the electrical component module PE. In this case, the first heat exchange medium may be a coolant and referred to as a first coolant. Therefore, the electrical component cooling device 100 may be a coolant-cooled cooling device.

Referring to FIG. 1, the electrical component cooling device 100 may include: a first circulation line 110 disposed to cool the electrical component module PE by circulating the first heat exchange medium through the electrical component module PE; a radiator 120 disposed in the first circulation line 110; a heat exchange line 130 branching off from the first circulation line 110 and passing through the first waste heat recovery chiller 400 to exchange heat with the air conditioning device 300; a 3-way valve 140 configured to selectively allow the first heat exchange medium to flow to the radiator 120 and the first waste heat recovery chiller 400; and a pump 150 configured to circulate the first heat exchange medium. As illustrated in FIG. 1, the radiator 120 and the first waste heat recovery chiller 400 may be disposed in parallel.

The first circulation line 110 may be disposed in the vehicle so that the first heat exchange medium may circulate through the first circulation line 110. Therefore, the first heat exchange medium through the first circulation line 110 may cool the electrical component module PE. In this case, the first circulation line 110 may be provided in the form of a pipe or the like.

Further, the radiator 120, the 3-way valve 140, the pump 150, and the like may be disposed in the first circulation line 110.

The radiator 120 may be a heat exchanger that dissipates the heat to the outside to prevent a temperature of the electrical component module PE from being raised to a predetermined temperature or higher. For example, the high-temperature first heat exchange medium, which has absorbed the heat generated by the electrical component module PE, may be circulated by the pump 150. Further, the first heat exchange medium may dissipate the heat to the outside while passing through the radiator 120.

The heat exchange line 130 may be connected to the first circulation line 110 and bypass the radiator 120. In detail, the heat exchange line 130 may be disposed to connect an inlet side and an outlet side of the radiator 120 based on the flow of the first heat exchange medium. In this case, the heat exchange line 130 may be disposed to pass through the first waste heat recovery chiller 400. Therefore, the first heat exchange medium flowing along the heat exchange line 130 may exchange heat with the third heat exchange medium of the air conditioning device 300 in the first waste heat recovery chiller 400. That is, the heat generated by the electrical component module PE may be transferred from the first waste heat recovery chiller 400 to the air conditioning device 300 by means of the first heat exchange medium.

The 3-way valve 140 of the electrical component cooling device 100 may perform control so that the first heat exchange medium flows to the radiator 120 or flows to the first waste heat recovery chiller 400 through the heat exchange line 130.

The pump 150 allows the first heat exchange medium to flow along the first circulation line 110 or the heat exchange line 130. In this case, the pump 150 of the electrical component cooling device 100 may be referred to as a first pump.

The battery cooling device 200 may cool the battery B by circulating the second heat exchange medium, thereby preventing the battery B from being overheated. Therefore, it is possible to improve the performance and lifespan of the battery B. In this case, the second heat exchange medium may be a coolant and referred to as a second coolant. Therefore, the battery cooling device 200 may be a coolant-cooled cooling device.

Referring to FIG. 1, the battery cooling device 200 may include: a second circulation line 210 disposed to cool the battery B by circulating the second heat exchange medium; and a pump 220 configured to circulate the second heat exchange medium along the second circulation line 210. In addition, the battery cooling device 200 may further include a heater 230 configured to heat the second heat exchange medium.

The second circulation line 210 may be disposed in the vehicle so that the second heat exchange medium may circulate through the second circulation line 210. Therefore, the second heat exchange medium circulating through the second circulation line 210 may cool the battery B. In this case, the second circulation line 210 may be provided in the form of a pipe or the like.

The second circulation line 210 may be disposed to pass through the second waste heat recovery chiller 500. Therefore, the second heat exchange medium flowing along the second circulation line 210 may exchange heat with the third heat exchange medium of the air conditioning device 300 in the second waste heat recovery chiller 500. That is, the heat generated by the battery B may be transferred from the second waste heat recovery chiller 500 to the air conditioning device 300 by means of the second heat exchange medium.

The pump 220 allows the second heat exchange medium to flow along the second circulation line 210. In this case, the pump 220 of the battery cooling device 200 may be referred to as a second pump. Therefore, the high-temperature second heat exchange medium, which has absorbed the heat generated by the battery B, may be circulated by the pump 220. Further, the second heat exchange medium may exchange heat with the third heat exchange medium while passing through the second waste heat recovery chiller 500.

The heater 230 may heat the second heat exchange medium flow along the second circulation line 210. As illustrated in FIG. 1, the heater 230 may be disposed at an outlet side of the battery B based on the flow of the second heat exchange medium, but the present disclosure is not necessarily limited thereto.

The air conditioning device 300 may adjust the temperature of the interior of the vehicle by using waste heat from the electrical component module PE transferred to the first waste heat recovery chiller 400 and waste heat of the battery B transferred to the second waste heat recovery chiller 500. For example, the air conditioning device 300 may improve the heat management efficiency of the heat management device 1 for a vehicle by using at least any one of the waste heat from the electrical component module PE and the waste heat from the battery B as a heat source.

Referring to FIG. 1, the air conditioning device 300 may include: an air conditioning line 310 disposed so that the third heat exchange medium flows therethrough; a compressor 311, a heat dissipation unit 312, an external heat exchanger 313, a first expansion means 314, and an evaporator 315 disposed on the air conditioning line 310; a branch line 320 branching off from one region of the air conditioning line 310 between the heat dissipation unit 312 and the external heat exchanger 313 and disposed to respectively pass through the first waste heat recovery chiller 400 and the second waste heat recovery chiller 500; and a flow control means configured to control the flow of the third heat exchange medium to the air conditioning line 310 or the branch line 320. In this case, the third heat exchange medium may be a refrigerant. Further, the heat dissipation unit 312 and the evaporator 315 may be disposed in an air conditioning casing C.

In addition, the air conditioning device 300 may further include a dehumidification line 350 provided to supply the refrigerant from the branch line 320 to the evaporator 315. In this case, the dehumidification line 350 may branch off from one region of the branch line 320 and be connected to one region of the air conditioning line 310 between the first expansion means 314 and the evaporator 315.

In addition, the air conditioning device 300 may further include an accumulator 316 disposed at an inlet side of the compressor 311 based on the flow of the third heat exchange medium of the air conditioning line 310.

The air conditioning line 310 enables the third heat exchange medium to circulate and flow to cool or heat the interior of the vehicle. Therefore, the compressor 311, the heat dissipation unit 312, the external heat exchanger 313, the first expansion means 314, the evaporator 315, the accumulator 316, and the like may be sequentially disposed in the air conditioning line 310 on the basis of the flow of the third heat exchange medium. In this case, the air conditioning line 310 may be provided in the form of a pipe or the like.

The compressor 311 compresses the third heat exchange medium flowing along the air conditioning line 310 and discharges the third heat exchange medium in a high-temperature and high-pressure gas phase. In this case, the compressor 311 may be referred to as a compressor.

The heat dissipation unit 312 is disposed in the air conditioning casing C and induces heat exchange between the third heat exchange medium and air introduced into the interior of the vehicle. For example, the heat dissipation unit 312 enables the heat exchange between the third heat exchange medium and the air in the air conditioning casing C. Therefore, the heat dissipation unit 312 may heat the interior of the vehicle. In this case, the heat dissipation unit 312 may be referred to as an internal heat exchanger.

The external heat exchanger 313 may radiate the heat by allowing the third heat exchange medium and the air introduced into the vehicle to exchange heat with each other. Therefore, the third heat exchange medium may be condensed. In this case, the external heat exchanger 313 may be referred to as a condenser.

The first expansion means 314 may be disposed in the air conditioning line 310 between the external heat exchanger 313 and the evaporator 315. As illustrated in FIG. 1, the first expansion means 314 may be disposed at an inlet side of the evaporator 315. Further, the first expansion means 314 may expand the third heat exchange medium condensed in the external heat exchanger 313.

A mechanical expansion valve (thermal expansion valve) or an electronic expansion valve may be used as the first expansion means 314. In particular, a mechanical expansion valve may be used as the first expansion means 314. Therefore, the first expansion means 314 may be referred to as a first expansion valve.

The evaporator 315 may be disposed in the air conditioning casing C and cool the air in the air conditioning casing C by using the third heat exchange medium. For example, the evaporator 315 may cool the air in the air conditioning casing C by using the third heat exchange medium supplied through the first expansion means 314. In this case, a temperature adjustment door D disposed in the air conditioning casing C may adjust the temperature of the interior of the vehicle by adjusting the amount of air that has performed the heat exchange through the evaporator 315.

The accumulator 316 may separate the third heat exchange medium into the liquid-phase third heat exchange medium and the gas-phase third heat exchange medium and supply the gas-phase third heat exchange medium to the compressor 311. As illustrated in FIG. 1, the accumulator 316 may be disposed at the inlet side of the compressor 311. In this case, the accumulator 316 may be referred to as a gas-liquid separator.

The branch line 320 may branch off from one region of the air conditioning line 310 between the heat dissipation unit 312 and the external heat exchanger 313 and disposed to respectively pass through the first waste heat recovery chiller 400 and the second waste heat recovery chiller 500.

For example, the branch line 320 may be connected to the air conditioning line 310 so that the third heat exchange medium passing through the heat exchanger bypasses the external heat exchanger 313, the first expansion means 314, and the evaporator 315. Therefore, in a heating mode of the heat management device 1 for a vehicle, the third heat exchange medium may pass through the first waste heat recovery chiller 400 and the second waste heat recovery chiller 500 through the branch line 320. In this case, the branch line 320 may be provided in the form of a pipe through which the third heat exchange medium may flow.

Meanwhile, since the branch line 320 bypasses the external heat exchanger 313, the third heat exchange medium, which has a relatively higher pressure than the case in which the branch line 320 passes through the external heat exchanger 313, may flow to the battery cooling device 200. Therefore, the third heat exchange medium, which flows at a high pressure along the branch line 320, may improve the performance of the heat exchange with the battery cooling device 200, thereby sufficiently controlling and improving the performance in cooling the battery B.

Referring to FIG. 1, the branch line 320 may include: a first branch line 321 connected to the air conditioning line between the heat dissipation unit 312 and the external heat exchanger 313; a second branch line 322 branching off from the first branch line 321 and disposed to pass through the first waste heat recovery chiller 400; and a third branch line 323 branching off from the first branch line 321 and disposed to pass through the second waste heat recovery chiller 500.

In this case, one side of the second branch line 322 branching off from the first branch line 321 may be connected to the accumulator 316 disposed at the inlet side of the compressor 311. In this case, since the third heat exchange medium passing through the second branch line 322 exchanges heat with the first heat exchange medium in the first waste heat recovery chiller 400, the air conditioning device 300 may use the waste heat from the electrical component module PE as a heat source.

In addition, one side of the third branch line 323 branching off from the first branch line 321 may be connected to the accumulator 316 disposed at the inlet side of the compressor 311. In this case, since the third heat exchange medium passing through the third branch line 323 exchanges heat with the second heat exchange medium in the second waste heat recovery chiller 500, the air conditioning device 300 may use the waste heat from the battery B as a heat source.

Therefore, the first waste heat recovery chiller 400 and the second waste heat recovery chiller 500 are disposed in parallel based on the air conditioning device 300 and exchange heat with the third heat exchange medium flowing along the second branch line 322 or the third branch line 323. Therefore, the heat management device 1 for a vehicle may use at least any one of the waste heat from the electrical component module PE and the waste heat from the battery B in accordance with the mode for adjusting the condition of the interior of the vehicle.

The flow control means may control the flow of the third heat exchange medium to the branch line 320 or the external heat exchanger 313 of the air conditioning line 310. In this case, the flow control means may perform control so that the third heat exchange medium flowing to the branch line 320 flows to at least any one of the first waste heat recovery chiller 400, the second waste heat recovery chiller 500, and the evaporator 315.

Therefore, the flow control means may use at least any one of the waste heat from the electrical component module PE and the waste heat from the battery B as a heat source in accordance with the mode for adjusting the condition of the interior of the vehicle.

In addition, the flow control means may allow the third heat exchange medium to bypass the external heat exchanger 313. Therefore, the flow control means may supply at least any one of the first waste heat recovery chiller 400, the second waste heat recovery chiller 500, and the evaporator 315 with the third heat exchange medium having a relatively higher pressure than in the case in which the third heat exchange medium passes through the external heat exchanger 313.

As illustrated in FIG. 1, the flow control means may include a first 3-way valve 330 and a second 3-way valve 340.

The first 3-way valve 330 may be disposed at a first branch point P1 at which the first branch line 321 of the branch line 320 meets the air conditioning line 310 between the heat dissipation unit 312 and the external heat exchanger 313.

The first 3-way valve 330 may perform control so that the third heat exchange medium passing through the heat dissipation unit 312 flows to the external heat exchanger 313 or the branch line 320.

The second 3-way valve 340 may perform control so that the third heat exchange medium passes through the first waste heat recovery chiller 400 or passes through both the first waste heat recovery chiller 400 and the second waste heat recovery chiller 500. In addition, the second 3-way valve 340 may perform control so that the third heat exchange medium passes only through the second waste heat recovery chiller 500.

Therefore, the heat management device 1 for a vehicle may have a plurality of modes to adjust the air conditioning condition of the interior of the vehicle. Therefore, the second 3-way valve 340 may perform control so that the third heat exchange medium may flow to only any one of the first waste heat recovery chiller 400 and the second waste heat recovery chiller 500 in order to heat the interior of the vehicle by using only any one of the waste heat from the electrical component module PE and the waste heat from the battery B as a heat source. Alternatively, the second 3-way valve 340 may perform control so that the third heat exchange medium flows to both the first waste heat recovery chiller 400 and the second waste heat recovery chiller 500 in order to heat the interior of the vehicle by using both the waste heat from the electrical component module PE and the waste heat from the battery B as heat sources.

As illustrated in FIG. 1, the second 3-way valve 340 may be disposed in the branch line 320. In detail, the second 3-way valve 340 may be disposed in the third branch line 323 of the branch line 320 so that the dehumidification line 350 may be connected to the third branch line 323.

The air conditioning device 300 may further include the dehumidification line 350 connected to the branch line 320 to improve the air conditioning quality in the interior of the vehicle. Therefore, the air conditioning device 300 may control the third heat exchange medium so that the third heat exchange medium passes through the evaporator 315 by means of the second 3-way valve 340.

Referring to FIG. 1, the dehumidification line 350 may branch off from the third branch line 323 and be connected to one region of the air conditioning line 310 between the first expansion means 314 and the evaporator 315. Therefore, the second 3-way valve 340 may be disposed at a second branch point P2, at which the third branch line 323 and the dehumidification line 350 meet, in order to allow the third heat exchange medium flowing along the third branch line 323 to flow to the dehumidification line 350.

Therefore, the third heat exchange medium flowing along the third branch line 323 may flow to the evaporator 315 by being guided to the dehumidification line 350 by the second 3-way valve 340, thereby decreasing humidity of the interior of the vehicle. For example, even during the process of heating the interior of the vehicle independently of the process of cooling the interior of the vehicle, the air conditioning device 300 may use the dehumidification line 350 to allow the third heat exchange medium to flow to the evaporator 315, thereby dehumidifying the interior of the vehicle.

In this case, the example has been described in which the dehumidification line 350 branches off from the third branch line 323, but the present disclosure is not necessarily limited thereto. For example, the third branch line 323 may branch off from the dehumidification line 350.

Meanwhile, the air conditioning device 300 may further include a second expansion means 360 disposed at an inlet side of the first 3-way valve 330 based on the flow of the third heat exchange medium. As illustrated in FIG. 1, the second expansion means 360 may be disposed in the air conditioning line 310 between the heat dissipation unit 312 and the first 3-way valve 330. Further, the second expansion means 360 may expand the third heat exchange medium having passed through the heat dissipation unit 312. In this case, the second expansion means 360 may be referred to as a second expansion valve. For example, a mechanical expansion valve (thermal expansion valve) or an electronic expansion valve may be used as the second expansion means 360. Further, the second expansion means 360 may be an orifice-integrated valve.

In addition, the air conditioning device 300 may further include a third expansion means 370 disposed at an inlet side of the second waste heat recovery chiller 500 based on the flow of the third heat exchange medium.

As illustrated in FIG. 1, the third expansion means 370 may be disposed in the third branch line 323. Further, the third expansion means 370 may expand the third heat exchange medium before the third heat exchange medium is introduced into the second waste heat recovery chiller 500.

For example, the third expansion means 370 may expand the third heat exchange medium, which is condensed in the external heat exchanger 313, before the third heat exchange medium is introduced into the second waste heat recovery chiller 500. Alternatively, the third expansion means 370 may expand the third heat exchange medium having passed through the second 3-way valve 340 before the third heat exchange medium is introduced into the second waste heat recovery chiller 500. In this case, the third expansion means 370 may be referred to as a third expansion valve. A mechanical expansion valve (thermal expansion valve) or an electronic expansion valve may be used as the third expansion means 370. In particular, an electronic expansion valve may be used as the third expansion means 370.

In addition, the air conditioning device 300 may further include a fourth branch line 380 formed so that the third heat exchange medium passing through the external heat exchanger 313 flows sequentially through the third expansion means 370 and the second waste heat recovery chiller 500.

The fourth branch line 380 may branch off from the air conditioning line 310 between the external heat exchanger 313 and the first expansion means 314 and be connected to the third branch line 323. In detail, the fourth branch line 380 may be connected to the third branch line 323 disposed at an inlet side of the third expansion means 370. Therefore, the third heat exchange medium flowing along the fourth branch line 380 may pass sequentially through the third expansion means 370 and the second waste heat recovery chiller 500.

The first waste heat recovery chiller 400 may be a heat exchanger that enables the first heat exchange medium flowing along the first circulation line 110 and the third heat exchange medium flowing along the second branch line 322 to exchange heat with each other. Therefore, one region of the first circulation line 110 and one region of the second branch line 322 may be disposed in the first waste heat recovery chiller 400. In this case, the first waste heat recovery chiller 400 may be referred to as a first chiller.

Therefore, since the third heat exchange medium exchanges heat with the first heat exchange medium in the first waste heat recovery chiller 400, the air conditioning device 300 may use the waste heat from the electrical component module PE as a heat source.

The second waste heat recovery chiller 500 may be a heat exchanger that enables the second heat exchange medium flowing along the second circulation line 210 and the third heat exchange medium flowing along the third branch line 323 or the fourth branch line 380 to exchange heat with each other. Therefore, one region of the second circulation line 210 and one region of the third branch line 323 may be disposed in the second waste heat recovery chiller 500. In this case, the second waste heat recovery chiller 500 may be referred to as a second chiller.

Therefore, since the third heat exchange medium exchanges heat with the second heat exchange medium in the second waste heat recovery chiller 500, the air conditioning device 300 may use the waste heat from the battery B as a heat source.

Meanwhile, the heat management device 1 for a vehicle may further include a PTC heater 600 disposed in the air conditioning casing C.

The heat management device 1 for a vehicle may heat the interior of the vehicle by using the waste heat from the electrical component module PE and the waste heat from the battery B as heat sources. However, when the heating is required which exceeds the maximum heating range in which the interior of the vehicle is heated by using the waste heat from the electrical component module PE and the waste heat from the battery B as heat sources, the heat management device 1 for a vehicle may use the PTC heater 600 to raise the temperature of the interior of the vehicle to a temperature higher than a temperature of the maximum heating range of the interior of the vehicle.

Figure 2:
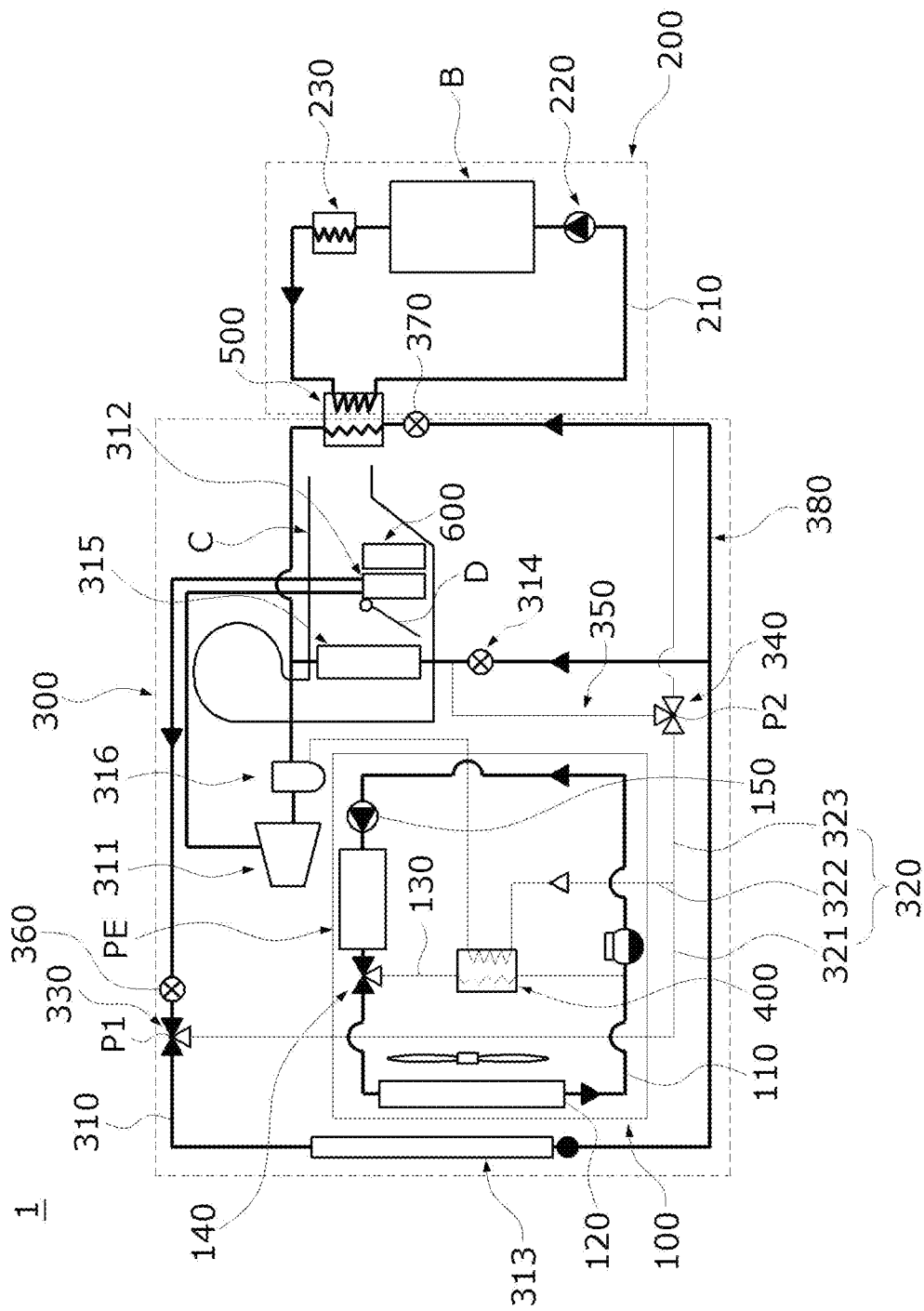
FIG. 2 is a view illustrating a cooling mode of the heat management device for a vehicle according to the first embodiment.

FIG. 2 is a view illustrating a cooling mode of the heat management device for a vehicle according to the first embodiment.

Referring to FIG. 2, in the cooling mode (A/C mode) of the heat management device 1 for a vehicle according to the first embodiment, the third heat exchange medium flowing along the air conditioning line 310 may cool the interior of the vehicle while circulating along the compressor 311, the heat dissipation unit 312, the external heat exchanger 313, the expansion means 314, the evaporator 315, and the accumulator 316.

In this case, the third heat exchange medium may pass through the second waste heat recovery chiller 500 through the fourth branch line 380 and flow to the accumulator 316.

Therefore, the battery cooling device 200 may cool the battery B by using the second heat exchange medium that performs the heat exchange in the second waste heat recovery chiller 500. Further, the electrical component cooling device 100 may cool the battery B by using the first heat exchange medium passing through the radiator 120.

Figure 3:
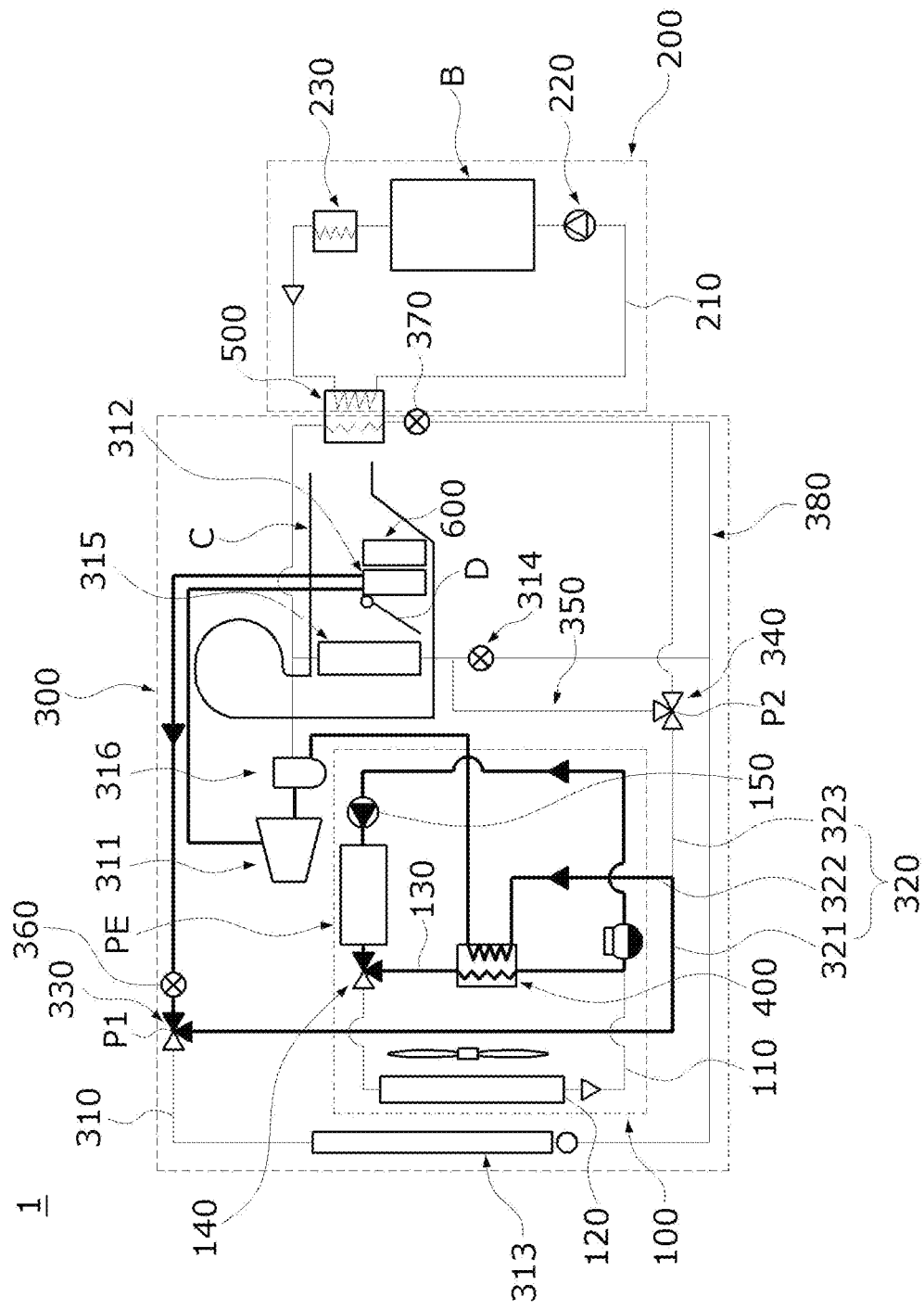
FIG. 3 is a view illustrating a first heating mode of a heating mode of the heat management device for a vehicle according to the first embodiment.
Figure 4:
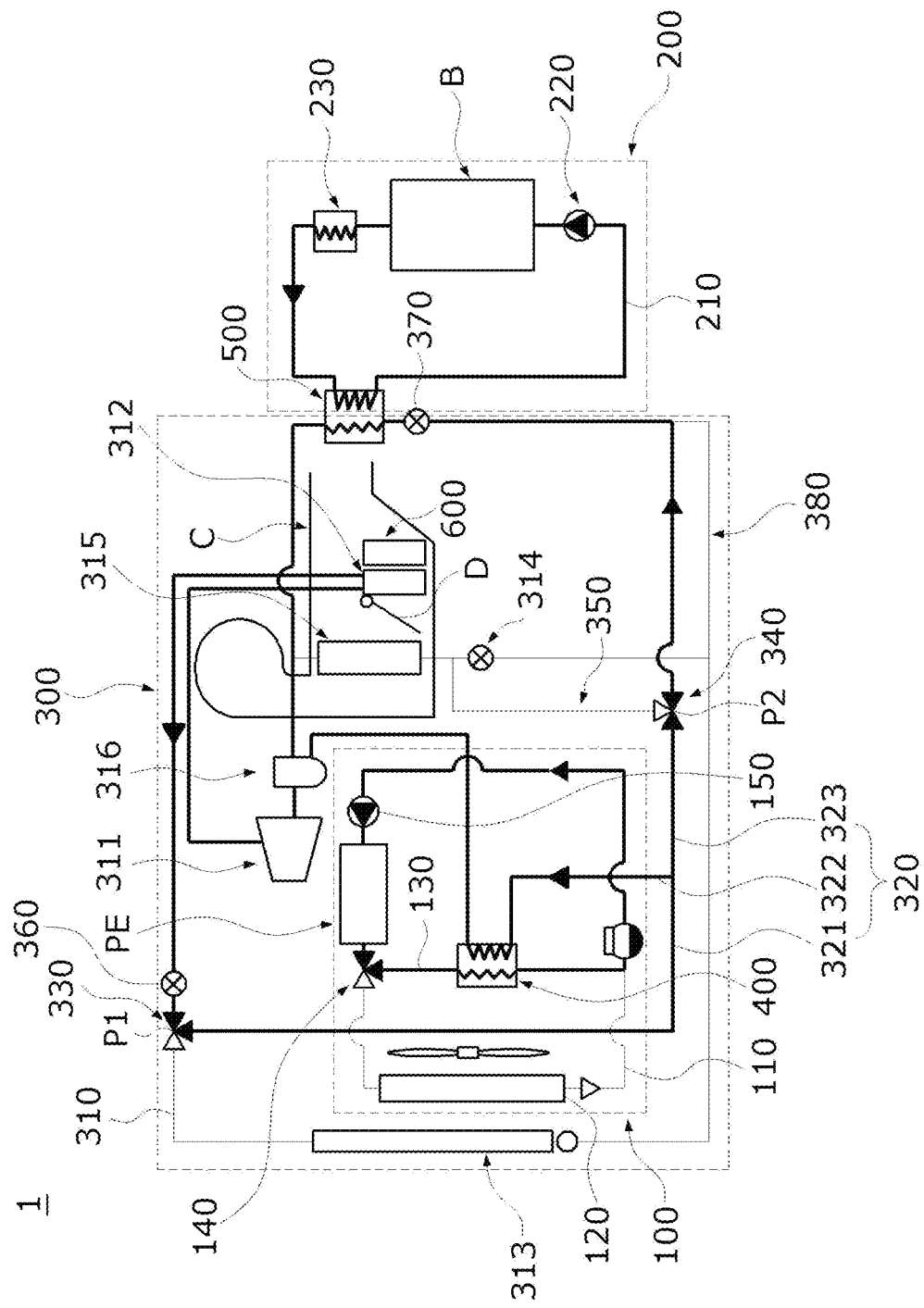
FIG. 4 is a view illustrating a second heating mode of the heating mode of the heat management device for a vehicle according to the first embodiment.
Figure 5:
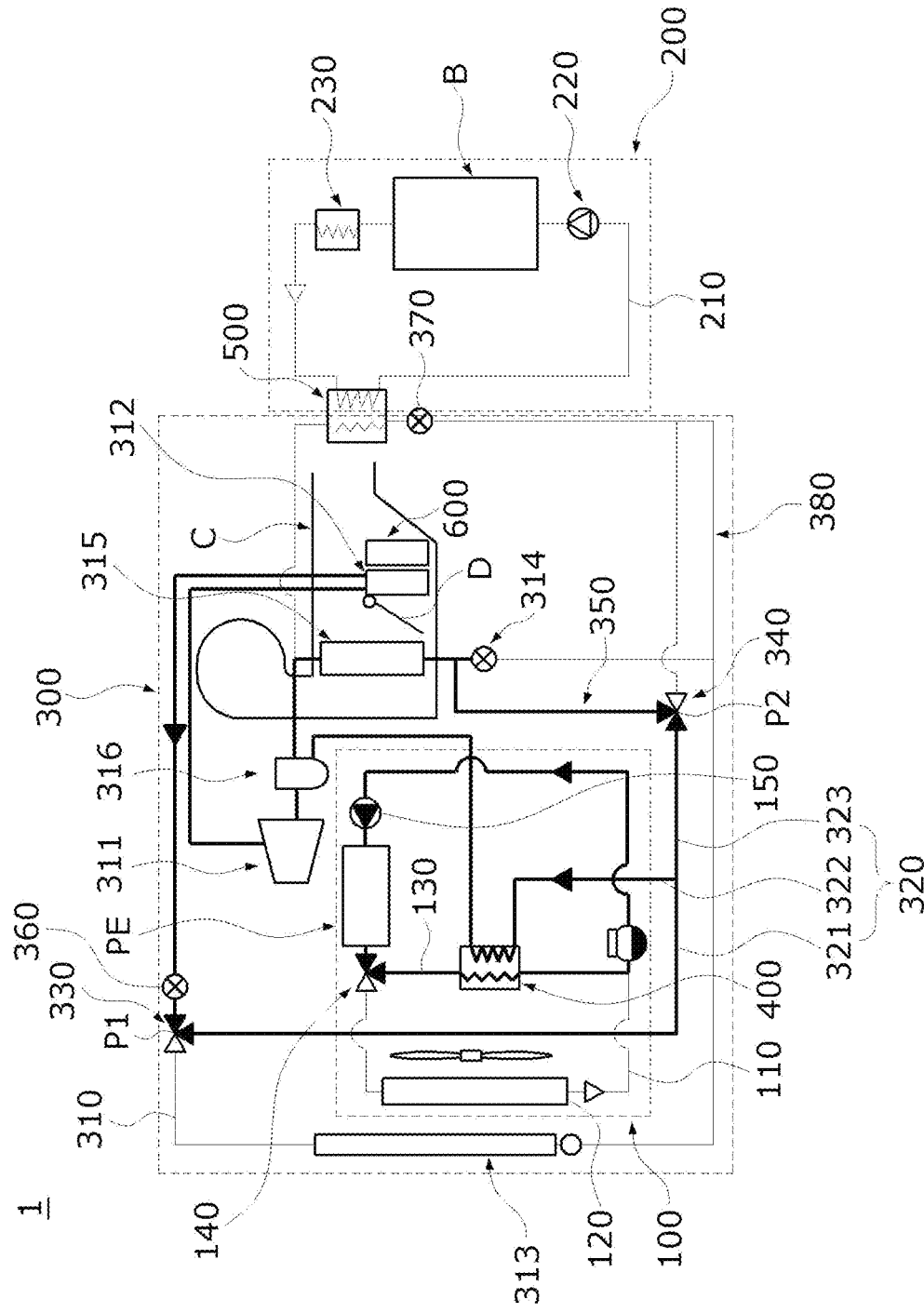
FIG. 5 is a view illustrating a third heating mode of the heating mode of the heat management device for a vehicle according to the first embodiment.

FIG. 3 is a view illustrating a first heating mode of the heating mode of the heat management device for a vehicle according to the first embodiment, FIG. 4 is a view illustrating a second heating mode of the heating mode of the heat management device for a vehicle according to the first embodiment, and FIG. 5 is a view illustrating a third heating mode of the heating mode of the heat management device for a vehicle according to the first embodiment.

Referring to FIGS. 3 to 5, the heat management device 1 for a vehicle according to the first embodiment may include a plurality of heating modes (H/P mode). In this case, the heat management device 1 for a vehicle according to the first embodiment implements three heating modes, but the present disclosure is not necessarily limited thereto.

The heat management device 1 for a vehicle according to the first embodiment may heat the interior of the vehicle by using the waste heat from the electrical component module PE as a heat source in a first heating mode. In this case, the first heating mode may be a partial heating mode. In this case, the partial heating mode may mean that the interior of the vehicle is heated to a temperature lower than a predetermined temperature or mean the heat that may be maximally provided to the air conditioning device 300 only by using any one of the waste heat from the electrical component module PE or the waste heat from the battery B.

Referring to FIG. 3, in the first heating mode, the third heat exchange medium flows to the first branch line 321 by the first 3-way valve 330. Further, the third heat exchange medium flowing along the first branch line 321 flows to the second branch line 322 by the second 3-way valve 340 and exchanges heat with the first heat exchange medium in the first waste heat recovery chiller 400. In this case, the first heat exchange medium of the electrical component cooling device 100 flows to the first waste heat recovery chiller 400 through the heat exchange line 130 by the 3-way valve 140 of the electrical component cooling device 100. Therefore, the heat management device 1 for a vehicle may heat the interior of the vehicle by using the waste heat from the electrical component module PE as a heat source.

That is, in a situation in which moisture is attached to the external heat exchanger 313 or an outside atmospheric temperature is very low, the heat management device 1 for a vehicle may supply the third heat exchange medium to the first waste heat recovery chiller 400 for cooling the electrical component module PE while allowing the third heat exchange medium to bypass the external heat exchanger 313.

The heat management device 1 for a vehicle according to the first embodiment may heat the interior of the vehicle by using both the waste heat from the electrical component module PE and the waste heat from the battery B as heat sources in a second heating mode. In this case, the second heating mode may be a maximum heating mode. In this case, the maximum heating mode may mean that the interior of the vehicle is heated to a temperature higher than a temperature in the partial heating mode or mean the heat that may be maximally provided to the air conditioning device 300 by using both the waste heat from the electrical component module PE and the waste heat from the battery B.

Referring to FIG. 4, in the second heating mode, the third heat exchange medium flows to the first branch line 321 by the first 3-way valve 330. Further, the third heat exchange medium flowing along the first branch line 321 flows to both the first waste heat recovery chiller 400 and the second waste heat recovery chiller 500 by the second 3-way valve 340.

For example, the third heat exchange medium flows to the second branch line 322 by the second 3-way valve 340 and exchanges heat with the first heat exchange medium in the first waste heat recovery chiller 400. At the same time, the third heat exchange medium flows to the third branch line 323 and exchanges heat with the second heat exchange medium in the second waste heat recovery chiller 500. In this case, the first heat exchange medium of the electrical component cooling device 100 flows to the first waste heat recovery chiller 400 through the heat exchange line 130 by the 3-way valve 140 of the electrical component cooling device 100. Therefore, the heat management device 1 for a vehicle may heat the interior of the vehicle to a temperature higher than a temperature of the first heating mode by using both the waste heat from the electrical component module PE and the waste heat from the battery B as heat sources.

The heat management device 1 for a vehicle according to the first embodiment may simultaneously heat and dehumidify the interior of the vehicle by using the waste heat from the electrical component module PE as a heat source in a third heating mode. In this case, the third heating mode may be a partial heating/dehumidification mode. Further, the partial heating/dehumidification mode may include the aforementioned partial heating mode and a dehumidification mode and decrease the humidity of the interior of the vehicle together with the partial heating mode.

Referring to FIG. 5, in the third heating mode, the third heat exchange medium flows to the first branch line 321 by the first 3-way valve 330. Further, the third heat exchange medium flowing along the first branch line 321 flows to both the first waste heat recovery chiller 400 and the evaporator 315 by the second 3-way valve 340. For example, a part of the third heat exchange medium flows to the second branch line 322 by the second 3-way valve 340 and exchanges heat with the first heat exchange medium in the first waste heat recovery chiller 400. The other part of the third heat exchange medium flows to the third branch line 323 and then flows to the evaporator 315 through the dehumidification line 350.

Therefore, the heat management device 1 for a vehicle may simultaneously heat and dehumidify the interior of the vehicle by using the waste heat from the electrical component module PE as a heat source in the third heating mode.

The heat management device 1 for a vehicle may heat the interior of the vehicle by using the third heat exchange medium passing through the external heat exchanger 313.

Figure 6:
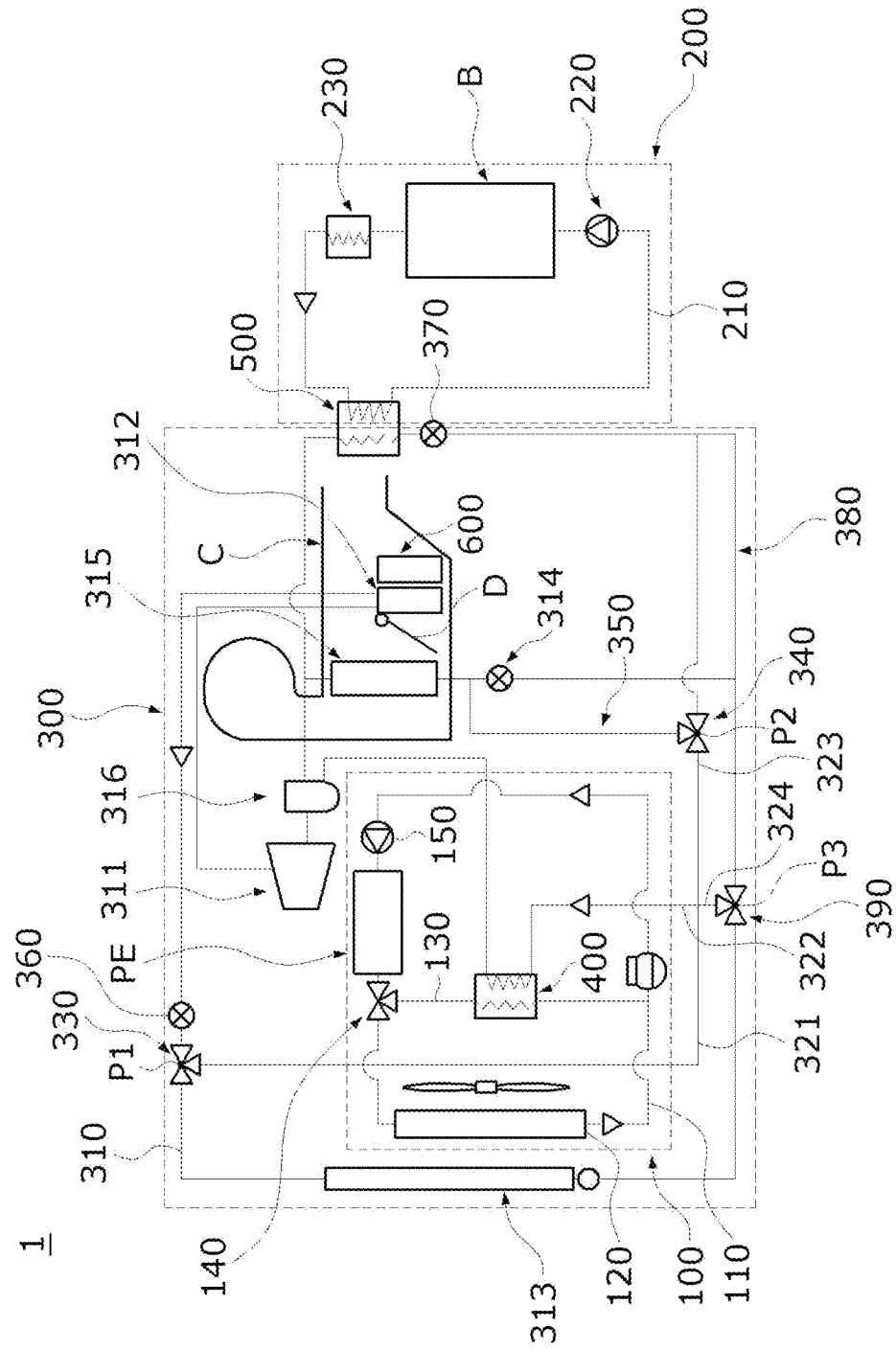
FIG. 6 is a view illustrating a modified example of the heat management device for a vehicle according to the first embodiment.
Figure 7:
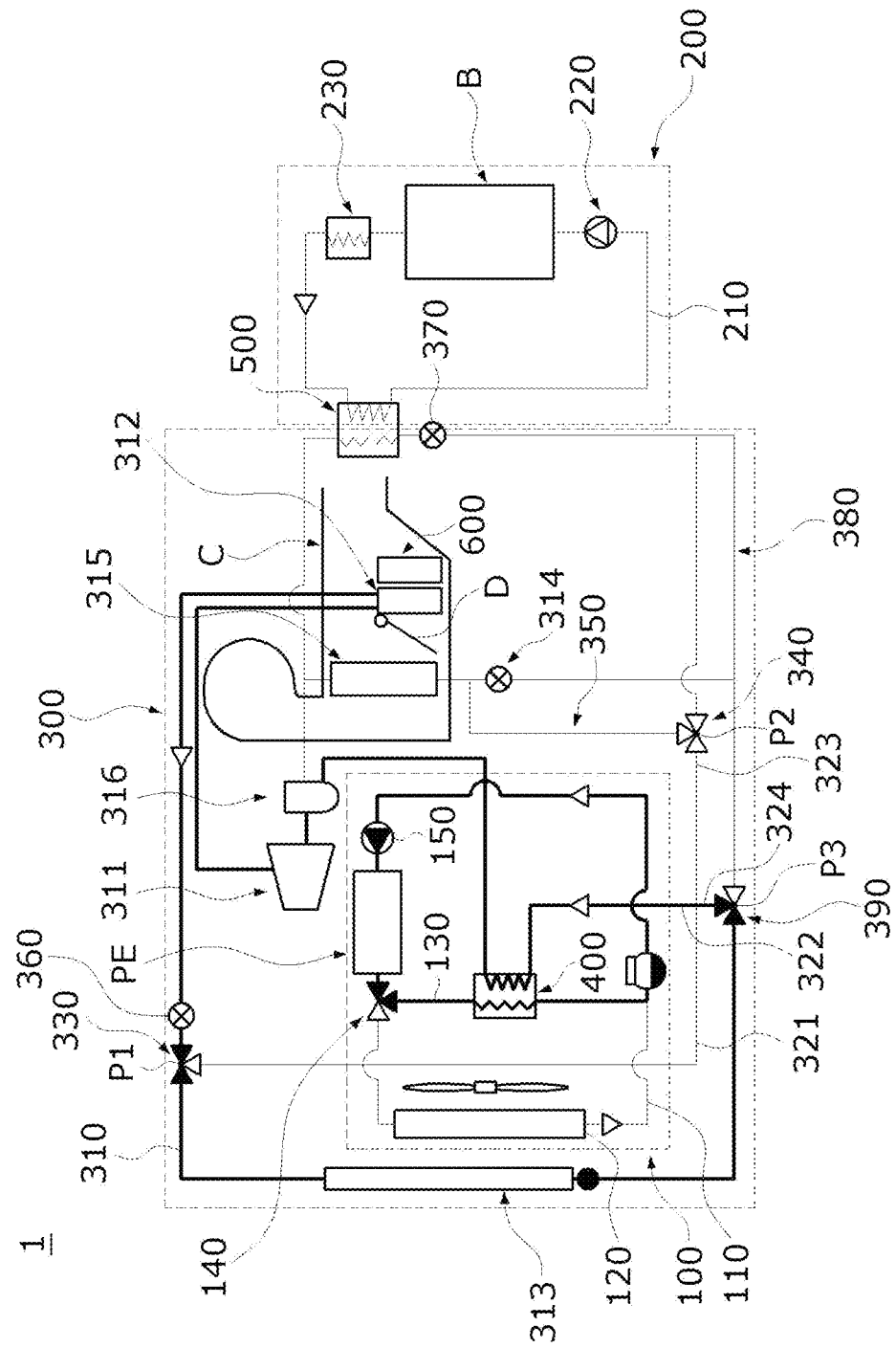
FIG. 7 is a view illustrating a first-first heating mode of the heating mode of the heat management device for a vehicle according to the first embodiment.

FIG. 6 is a view illustrating a modified example of the heat management device for a vehicle according to the first embodiment, and FIG. 7 is a view illustrating a first-first heating mode of the heating mode of the heat management device for a vehicle according to the first embodiment.

Referring to FIG. 6, the heat management device 1 for a vehicle may further include a fifth branch line 324 and a third 3-way valve 390. Therefore, the flow control means may further include the third 3-way valve 390.

The fifth branch line 324 may branch off from the air conditioning line 310 between the external heat exchanger 313 and the first expansion means 314 and connect the second branch line 322.

The third 3-way valve 390 may be disposed at a third branch point P3 at which the air conditioning line 310 and the fifth branch line 324 meet between the external heat exchanger 313 and the first expansion means 314.

Therefore, the third heat exchange medium passing through the external heat exchanger 313 may flow to the first waste heat recovery chiller 400 by the third 3-way valve 390, thereby heating the interior of the vehicle.

Therefore, the heat management device 1 for a vehicle further including the fifth branch line 324 and the third 3-way valve 390 may implement the cooling mode and the first to third heating mode and additionally implement a first-first heating mode which is a modified mode of the first heating mode.

The heat management device 1 for a vehicle according to the first embodiment may heat the interior of the vehicle by using the waste heat from the electrical component module PE as a heat source in the first-first heating mode. In this case, the first-first heating mode may be a partial heating mode.

In comparison between the first heating mode and the first-first heating mode, the first heating mode differs from the first-first heating mode in that the heat exchange medium heats the interior of the vehicle while bypassing the external heat exchanger 313 and the heat management device 1 for a vehicle operates in the state in which moisture is attached to the external heat exchanger 313 or the outside atmospheric temperature is very low.

Referring to FIG. 7, in the first-first heating mode, the third heat exchange medium flows to the external heat exchanger 313 by the first 3-way valve 330. Further, the third heat exchange medium passing through the external heat exchanger 313 flows sequentially through the third 3-way valve 390, the fifth branch line 324, and the second branch line 322 and exchanges heat with the first heat exchange medium in the first waste heat recovery chiller 400. In this case, the second 3-way valve 340 may prevent the third heat exchange medium from flowing to the third branch line 323.

A heat management method for a vehicle according to the first embodiment refers to a control method of cooling, heating, and dehumidifying/heating the interior of the vehicle by using the heat management device 1 for a vehicle according to the first embodiment.

The heat management method for a vehicle according to the first embodiment may include a step of selecting the mode, and a step of cooling or heating the interior of the vehicle. In this case, depending on the modes, the step of heating the interior of the vehicle may include a partial heating step, a maximum heating step, and a partial heating/dehumidification step.

When the cooling mode (A/C mode) is selected in the step of selecting the mode, the heat management device 1 for a vehicle may perform the cooling step of cooling the interior of the vehicle.

Referring to FIG. 2, the cooling step may lower the temperature of the interior of the vehicle to a temperature lower than an outside temperature by circulating the third heat exchange medium along the compressor 311, the heat dissipation unit 312, the external heat exchanger 313, the expansion means 314, the evaporator 315, and the accumulator 316. In this case, the third heat exchange medium may pass through the second waste heat recovery chiller 500 through the fourth branch line 380 and flow to the accumulator 316. Therefore, the battery cooling device 200 may cool the battery B by using the second heat exchange medium that exchanges heat in the second waste heat recovery chiller 500.

When the first heating mode, which is the partial heating mode of the heating mode (H/P mode), selected in the step of selecting the mode, the heat management device 1 for a vehicle may perform the partial heating step of heating the interior of the vehicle by using the waste heat from the electrical component module PE as a heat source.

Referring to FIG. 3, the partial heating step may heat the interior of the vehicle by using the waste heat from the electrical component module PE as a heat source. For example, in the partial heating step, the third heat exchange medium flows to the first branch line 321 by the first 3-way valve 330, and the third heat exchange medium flowing along the first branch line 321 flows to the second branch line 322 by the second 3-way valve 340 and exchanges heat with the first heat exchange medium in the first waste heat recovery chiller 400, thereby heating the interior of the vehicle.

When the second heating mode, which is the maximum heating mode of the heating mode (H/P mode), is selected in the step of selecting the mode, the heat management device 1 for a vehicle may perform the maximum heating step that heats the interior of the vehicle by using both the waste heat from the electrical component module PE and the waste heat from the battery B as heat sources.

Referring to FIG. 4, the maximum heating step may heat the interior of the vehicle by using the waste heat from the electrical component module PE and the waste heat from the battery B as heat sources. For example, in the maximum heating step, the third heat exchange medium flows to the first branch line 321 by the first 3-way valve 330, and the third heat exchange medium flowing along the first branch line 321 flows to both the first waste heat recovery chiller 400 and the second waste heat recovery chiller 500 by the second 3-way valve 340, thereby heating the interior of the vehicle.

When the third heating mode, which is the partial heating/dehumidification mode of the heating mode (H/P mode), is selected in the step of selecting the mode, the heat management device 1 for a vehicle may perform the partial heating/dehumidification step that heats the interior of the vehicle, and at the same time, decreases the humidity of the interior of the vehicle by using the waste heat from the electrical component module PE.

Referring to FIG. 5, the partial heating/dehumidification step may heat the interior of the vehicle, and at the same time, decrease the humidity of the interior of the vehicle by using the waste heat from the electrical component module PE as a heat source.

For example, in the partial heating/dehumidification step, the third heat exchange medium may flow to the first branch line 321 by the first 3-way valve 330, and the third heat exchange medium flowing along the first branch line 321 may flow to both the first waste heat recovery chiller 400 and the evaporator 315 by the second 3-way valve 340. Therefore, the partial heating/dehumidification step may simultaneously heat and dehumidify the interior of the vehicle.

Referring to FIG. 7, the partial heating step may heat the interior of the vehicle by using the waste heat from the electrical component module PE as a heat source. For example, in the partial heating step, the third heat exchange medium flows to the external heat exchanger 313 by the first 3-way valve 330, and the third heat exchange medium passing through the external heat exchanger 313 flows to the second branch line 322 by the third 3-way valve 390 and the fifth branch line 324 and exchanges heat with the first heat exchange medium in the first waste heat recovery chiller 400. In this case, the second 3-way valve 340 may prevent the third heat exchange medium from flowing to the third branch line 323. Therefore, the interior of the vehicle may be heated.

Second Embodiment

Figure 8:
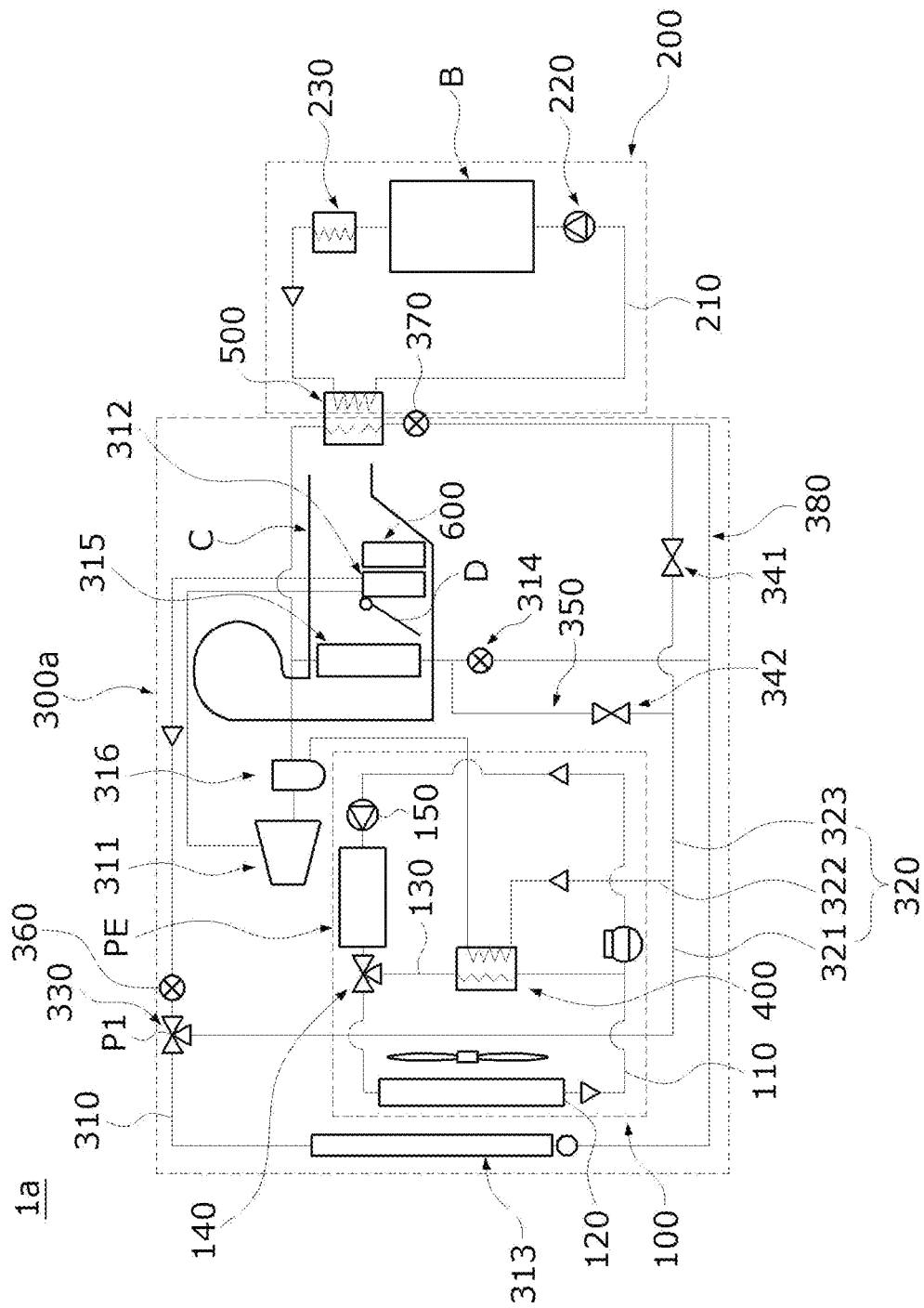
FIG. 8 is a view illustrating a heat management device for a vehicle according to a second embodiment.
Figure 9:
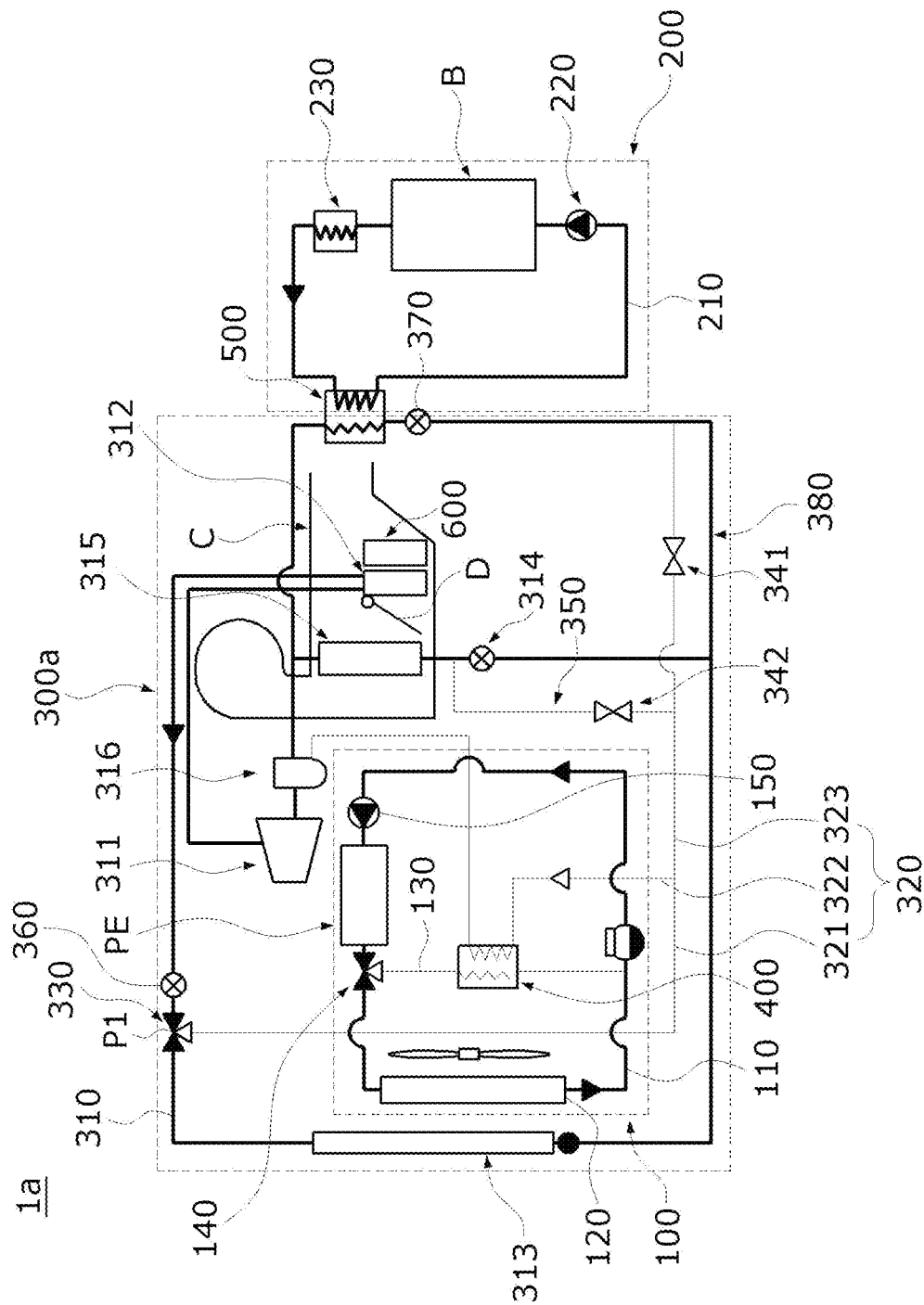
FIG. 9 is a view illustrating a cooling mode of the heat management device for a vehicle according to the second embodiment.
Figure 10:
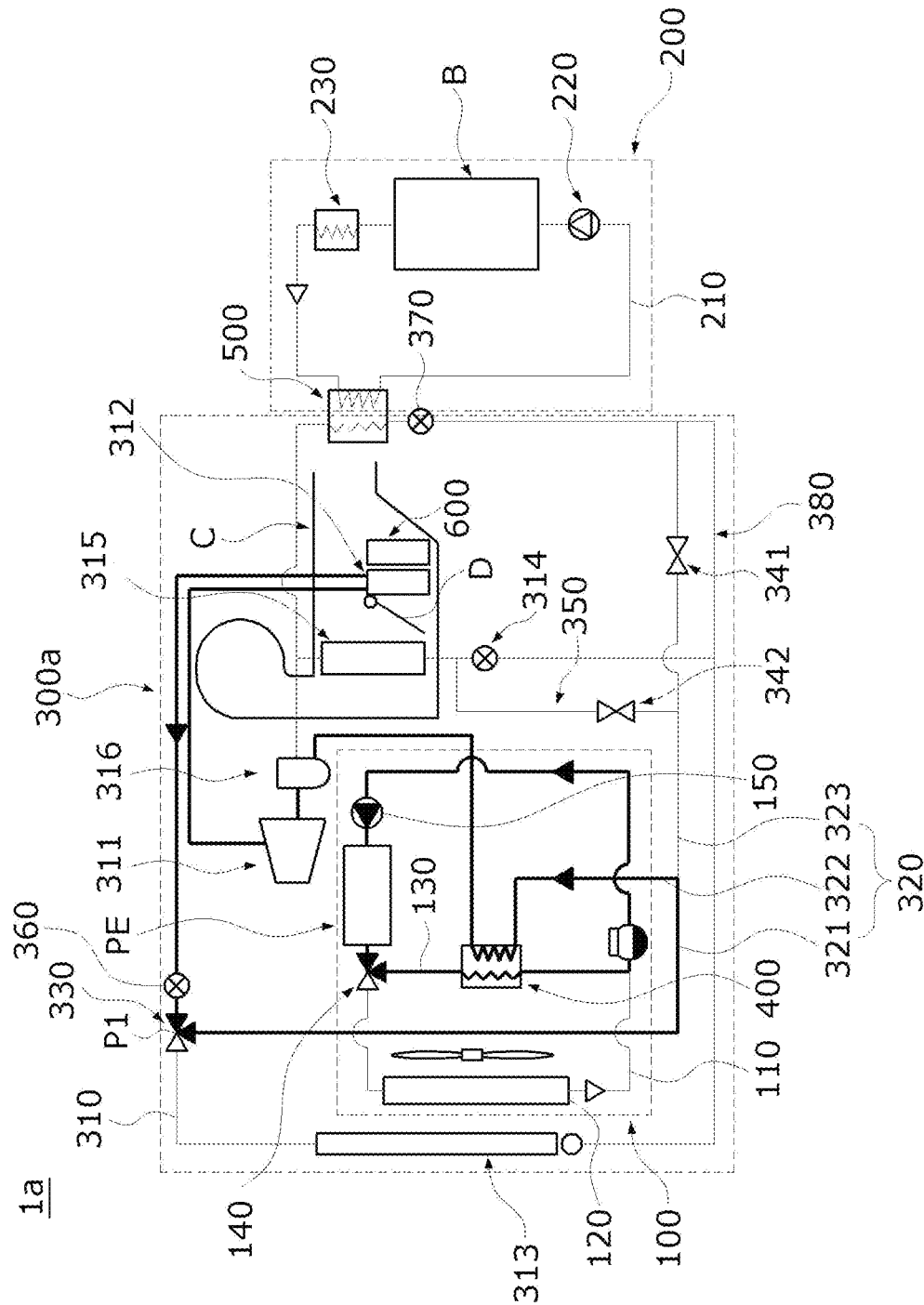
FIG. 10 is a view illustrating a first heating mode of a heating mode of the heat management device for a vehicle according to the second embodiment.
Figure 11:
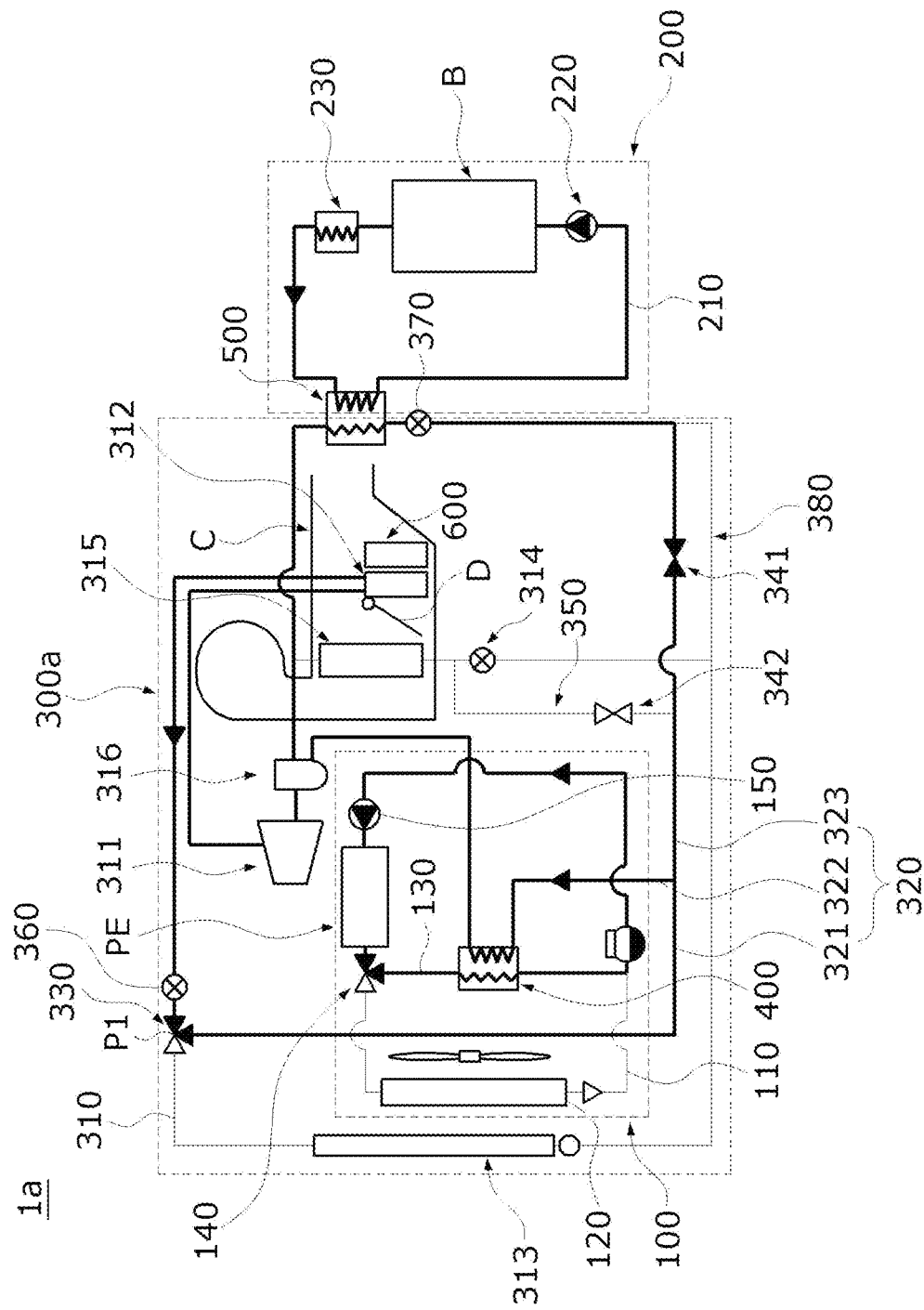
FIG. 11 is a view illustrating a second heating mode of the heating mode of the heat management device for a vehicle according to the second embodiment.
Figure 12:
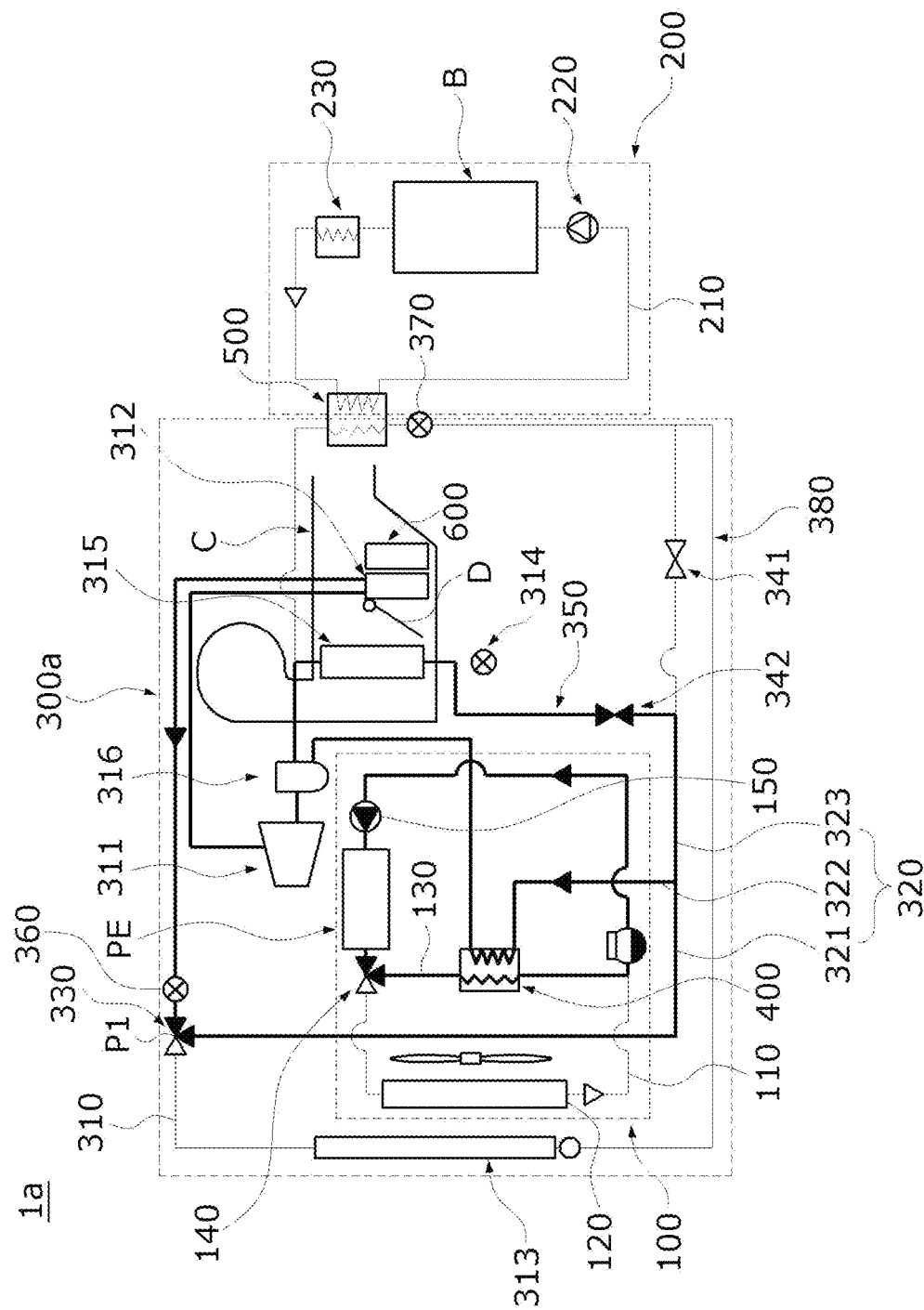
FIG. 12 is a view illustrating a third heating mode of the heating mode of the heat management device for a vehicle according to the second embodiment.
Figure 13:
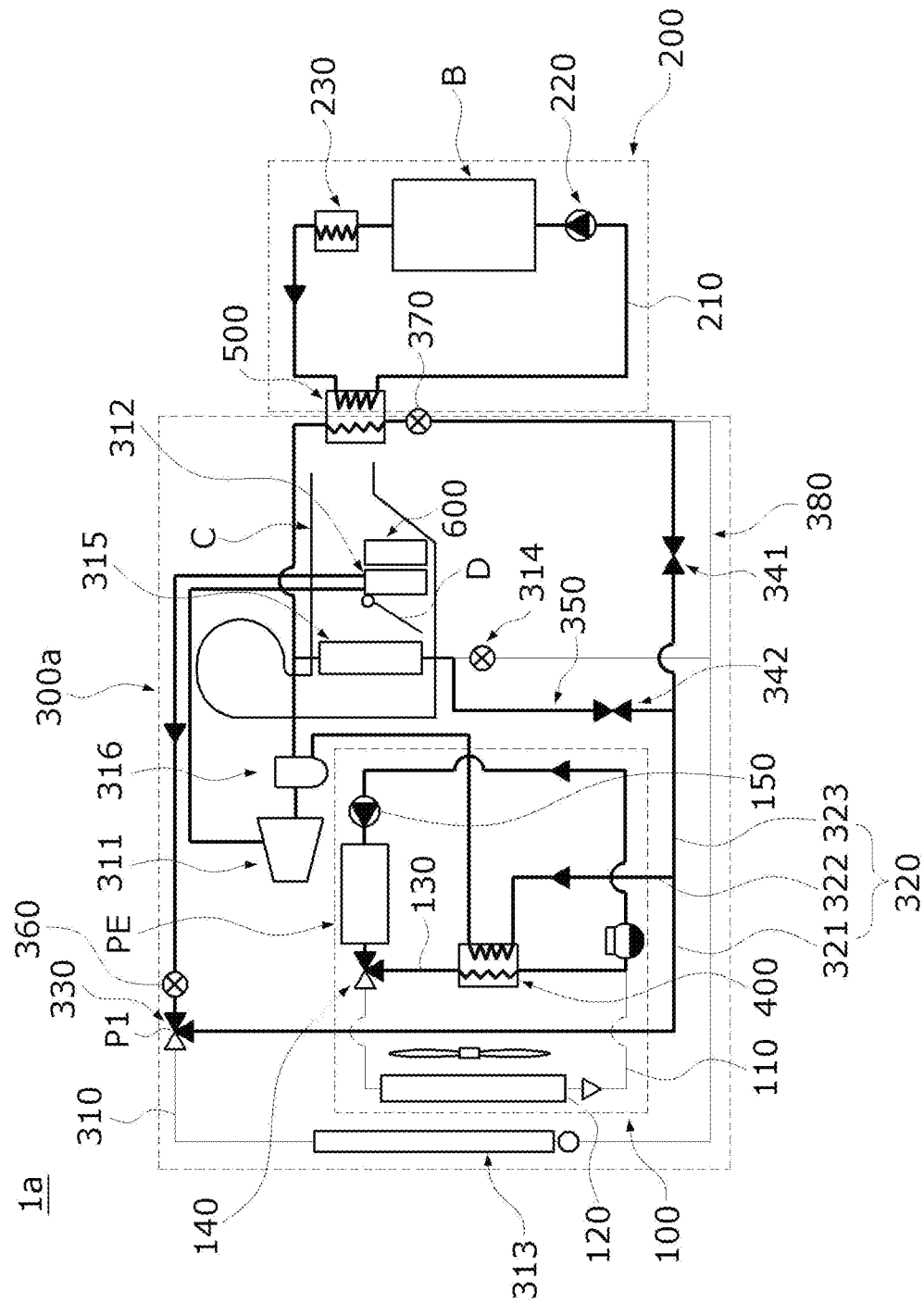
FIG. 13 is a view illustrating a fourth heating mode of the heating mode of the heat management device for a vehicle according to the second embodiment.

FIG. 8 is a view illustrating a heat management device for a vehicle according to a second embodiment, FIG. 9 is a view illustrating a cooling mode of the heat management device for a vehicle according to the second embodiment, FIG. 10 is a view illustrating a first heating mode of a heating mode of the heat management device for a vehicle according to the second embodiment, FIG. 11 is a view illustrating a second heating mode of the heating mode of the heat management device for a vehicle according to the second embodiment, FIG. 12 is a view illustrating a third heating mode of the heating mode of the heat management device for a vehicle according to the second embodiment, and FIG. 13 is a view illustrating a fourth heating mode of the heating mode of the heat management device for a vehicle according to the second embodiment.

In comparison between the heat management device 1 for a vehicle according to the first embodiment and a heat management device 1a for a vehicle according to the second embodiment, there is a difference in that a flow control means of the heat management device 1a for a vehicle uses two 2-way valves unlike the second 3-way valve 340 of the heat management device 1 for a vehicle. Therefore, the heat management device 1a for a vehicle may decrease the humidity of the interior of the vehicle even in the second heating mode that is the maximum heating mode.

Hereinafter, in the description of the heat management device 1a for a vehicle according to the second embodiment, the constituent elements identical to the constituent elements of the heat management device 1 for a vehicle according to the first embodiment will be assigned with the same reference numerals, and the specific description thereof will be omitted.

Referring to FIG. 8, the heat management device 1a for a vehicle according to the second embodiment may include: an electrical component cooling device 100 capable of cooling an electrical component module PE; a battery cooling device 200 capable of cooling a battery B; an air conditioning device 300a configured to adjust an air temperature of an interior of a vehicle; a first waste heat recovery chiller 400 disposed so that a first heat exchange medium of the electrical component cooling device 100 may exchange heat with a third heat exchange medium of the air conditioning device 300a; and a second waste heat recovery chiller 500 disposed so that a second heat exchange medium of the battery cooling device 200 may exchange heat with the third heat exchange medium of the air conditioning device 300a.

In this case, the first heat exchange medium of the electrical component cooling device 100 and the second heat exchange medium of the battery cooling device 200 respectively circulate along circulation structures separately disposed without a connection structure connecting the electrical component cooling device 100 and the battery cooling device 200. That is, the electrical component cooling device 100 and the battery cooling device 200 may be disposed in the vehicle and respectively provided in the parallel structures separately disposed.

Further, the air conditioning device 300a may adjust an air conditioning condition of the interior of the vehicle by using heat of the electrical component cooling device 100 and heat of the battery cooling device 200 as heat sources.

The air conditioning device 300a may adjust the temperature of the interior of the vehicle by using waste heat from the electrical component module PE transferred to the first waste heat recovery chiller 400 and waste heat of the battery B transferred to the second waste heat recovery chiller 500. For example, the air conditioning device 300a may improve the heat management efficiency of the heat management device 1a for a vehicle by using at least any one of the waste heat from the electrical component module PE and the waste heat from the battery B as a heat source.

Referring to FIG. 8, the air conditioning device 300a may include: an air conditioning line 310 disposed so that the third heat exchange medium flows therethrough; a compressor 311, a heat dissipation unit 312, an external heat exchanger 313, a first expansion means 314, and an evaporator 315 disposed on the air conditioning line 310; a branch line 320 branching off from one region of the air conditioning line 310 between the heat dissipation unit 312 and the external heat exchanger 313 and disposed to respectively pass through the first waste heat recovery chiller 400 and the second waste heat recovery chiller 500; a first 3-way valve 330 disposed at a first branch point P1; and a flow control means disposed in the branch line 320. In this case, the flow control means of the heat management device 1a for a vehicle according to the second embodiment may use two 2-way valves 341 and 342 instead of the second 3-way valve 340 of the flow control means of the heat management device 1 for a vehicle.

Further, the branch line 320 may include: a first branch line 321 connected to the air conditioning line between the heat dissipation unit 312 and the external heat exchanger 313; a second branch line 322 branching off from the first branch line 321 and disposed to pass through the first waste heat recovery chiller 400; and a third branch line 323 branching off from the first branch line 321 and disposed to pass through the second waste heat recovery chiller 500.

In addition, the air conditioning device 300a may further include an accumulator 316 disposed at an inlet side of the compressor 311 based on the flow of the third heat exchange medium of the air conditioning line 310.

In addition, the air conditioning device 300a may further include a dehumidification line 350 branching off from one region of the branch line 320 and connected to one region of the air conditioning line 310 between the first expansion means 314 and the evaporator 315.

In addition, the air conditioning device 300a may further include a second expansion means 360 disposed at an inlet side of the first 3-way valve 330 based on the flow of the third heat exchange medium.

In addition, the air conditioning device 300a may further include a third expansion means 370 disposed at an inlet side of the second waste heat recovery chiller 500 based on the flow of the third heat exchange medium.

In addition, the air conditioning device 300a may further include a fourth branch line 380 formed so that the third heat exchange medium passing through the external heat exchanger 313 flows sequentially through the first expansion means 314 and the second waste heat recovery chiller 500.

In addition, the heat management device 1a for a vehicle may further include a PTC heater 600 disposed in the air conditioning casing C.

Hereinafter, the flow control means of the heat management device 1a for a vehicle according to the second embodiment, which is different from the heat management device 1 for a vehicle according to the first embodiment, and a plurality of modes of the heat management device 1a for a vehicle, which uses the flow control means to adjust the air conditioning condition of the interior of the vehicle, will be described.

The flow control means of the air conditioning device 300a may control the flow of the third heat exchange medium to the branch line 320 or the external heat exchanger 313 of the air conditioning line 310.

As illustrated in FIG. 8, the flow control means of the heat management device 1a for a vehicle may include a first 3-way valve 330, two first 2-way valves 341, and a second 2-way valve 342. In this case, the first 2-way valve 341 may be disposed in the third branch line 323, and the second 2-way valve 342 may be disposed in the dehumidification line 350.

Therefore, the flow control means may perform control so that the third heat exchange medium flowing to the branch line 320 flows to at least any one of the first waste heat recovery chiller 400, the second waste heat recovery chiller 500, and the evaporator 315.

For example, the flow control means of the air conditioning device 300a may perform control so that the third heat exchange medium passes through the first waste heat recovery chiller 400. In addition, the flow control means may perform control so that the third heat exchange medium passes through only the second waste heat recovery chiller 500.

Alternatively, the flow control means may perform control so that the third heat exchange medium passes through both the first waste heat recovery chiller 400 and the second waste heat recovery chiller 500.

Alternatively, the flow control means may perform control so that the third heat exchange medium passes through both the evaporator 315 and the first waste heat recovery chiller 400.

Alternatively, the flow control means may perform control so that the third heat exchange medium passes through all the evaporator 315, the first waste heat recovery chiller 400, and the second waste heat recovery chiller 500.

Therefore, the heat management device 1a for a vehicle may have a plurality of modes to adjust the air conditioning condition of the interior of the vehicle. Therefore, the flow control means may perform control so that the third heat exchange medium may flow to only any one of the first waste heat recovery chiller 400 and the second waste heat recovery chiller 500 in order to heat the interior of the vehicle by using only any one of the waste heat from the electrical component module PE and the waste heat from the battery B as a heat source.

Alternatively, the flow control means may perform control so that the third heat exchange medium flows to both the first waste heat recovery chiller 400 and the second waste heat recovery chiller 500 in order to heat the interior of the vehicle by using both the waste heat from the electrical component module PE and the waste heat from the battery B as heat sources. In this case, the flow control means may allow the third heat exchange medium to flow to the dehumidification line 350, thereby decreasing the humidity of the interior of the vehicle.

Referring to FIG. 9, in the cooling mode (A/C mode) of the heat management device 1a for a vehicle according to the second embodiment, the third heat exchange medium flowing along the air conditioning line 310 may cool the interior of the vehicle while circulating along the compressor 311, the heat dissipation unit 312, the external heat exchanger 313, the expansion means 314, the evaporator 315, and the accumulator 316.

In this case, the third heat exchange medium may pass through the second waste heat recovery chiller 500 through the fourth branch line 380 and flow to the accumulator 316. Therefore, the battery cooling device 200 may cool the battery B by using the second heat exchange medium that exchanges heat in the second waste heat recovery chiller 500. Further, the electrical component cooling device 100 may cool the battery B by using the first heat exchange medium passing through the radiator 120.

Referring to FIGS. 10 to 13, the heat management device 1a for a vehicle according to the second embodiment may include a plurality of heating modes (H/P mode). In this case, the heat management device 1a for a vehicle according to the second embodiment implements four heating modes, but the present disclosure is not necessarily limited thereto.

The heat management device 1a for a vehicle according to the second embodiment may heat the interior of the vehicle by using the waste heat from the electrical component module PE as a heat source in a first heating mode. In this case, the first heating mode may be a partial heating mode. In this case, the partial heating mode may mean that the interior of the vehicle is heated to a temperature lower than a predetermined temperature or mean the heat that may be maximally provided to the air conditioning device 300a only by using any one of the waste heat from the electrical component module PE or the waste heat from the battery B.

Referring to FIG. 10, in the first heating mode, the third heat exchange medium flows to the first branch line 321 by the first 3-way valve 330. Further, the third heat exchange medium flowing along the first branch line 321 flows to the second branch line 322 by the first 2-way valve 341 and the second 2-way valve 342 of the flow control means and exchanges heat with the first heat exchange medium in the first waste heat recovery chiller 400.

For example, the first 2-way valve 341 and the second 2-way valve 342 are turned off. In this case, the OFF state of the first 2-way valve 341 or the second 2-way valve 342 may mean that the flow of the third heat exchange medium is blocked by the first 2-way valve 341 or the second 2-way valve 342. In addition, an ON state of the first 2-way valve 341 or the second 2-way valve 342 may mean that the third heat exchange medium flows by the first 2-way valve 341 or the second 2-way valve 342.

Therefore, the third heat exchange medium flows to the second branch line 322 by the flow control means and exchanges heat with the first heat exchange medium in the first waste heat recovery chiller 400. In this case, the first heat exchange medium of the electrical component cooling device 100 flows to the first waste heat recovery chiller 400 through the first heat exchange line 130 by the 3-way valve 140 of the electrical component cooling device 100. Therefore, the heat management device 1a for a vehicle may heat the interior of the vehicle by using the waste heat from the electrical component module PE as a heat source.

That is, in a situation in which moisture is attached to the external heat exchanger 313 or an outside atmospheric temperature is very low, the heat management device 1a for a vehicle may supply the third heat exchange medium to the first waste heat recovery chiller 400 for cooling the electrical component module PE while allowing the third heat exchange medium to bypass the external heat exchanger 313, thereby heating the interior of the vehicle.

The heat management device 1a for a vehicle according to the second embodiment may heat the interior of the vehicle by using both the waste heat from the electrical component module PE and the waste heat from the battery B as heat sources in a second heating mode. In this case, the second heating mode may be a maximum heating mode. In this case, the maximum heating mode may mean that the interior of the vehicle is heated to a temperature higher than a temperature in the partial heating mode or mean the heat that may be maximally provided to the air conditioning device 300a by using both the waste heat from the electrical component module PE and the waste heat from the battery B.

Referring to FIG. 11, in the second heating mode, the third heat exchange medium flows to the first branch line 321 by the first 3-way valve 330. Further, the third heat exchange medium flowing along the first branch line 321 flows to both the first waste heat recovery chiller 400 and the second waste heat recovery chiller 500 by the first 2-way valve 341 and the second 2-way valve 342.

For example, the first 2-way valve 341 is turned on, and the second 2-way valve 342 is turned off. Therefore, the third heat exchange medium flows to the second branch line 322 and exchanges heat with the first heat exchange medium in the first waste heat recovery chiller 400. At the same time, the third heat exchange medium flows to the third branch line 323 and exchanges heat with the second heat exchange medium in the second waste heat recovery chiller 500. In this case, the first heat exchange medium of the electrical component cooling device 100 flows to the first waste heat recovery chiller 400 through the first heat exchange line 130 by the 3-way valve 140 of the electrical component cooling device 100. Therefore, the heat management device 1a for a vehicle may heat the interior of the vehicle to a temperature higher than a temperature of the first heating mode by using both the waste heat from the electrical component module PE and the waste heat from the battery B as heat sources.

The heat management device 1a for a vehicle according to the second embodiment may simultaneously heat and dehumidify the interior of the vehicle by using the waste heat from the electrical component module PE as a heat source in a third heating mode. In this case, the third heating mode may be a partial heating/dehumidification mode. In this case, the partial heating/dehumidification mode may include the aforementioned partial heating mode and the dehumidification mode and decrease the humidity of the interior of the vehicle together with the partial heating mode.

Referring to FIG. 12, in the third heating mode, the third heat exchange medium flows to the first branch line 321 by the first 3-way valve 330. Further, the third heat exchange medium flowing along the first branch line 321 flows to both the first waste heat recovery chiller 400 and the evaporator 315 by the first 2-way valve 341 and the second 2-way valve 342.

For example, the first 2-way valve 341 is turned off, and the second 2-way valve 342 is turned on. Therefore, a part of the third heat exchange medium flows to the second branch line 322 and exchanges heat with the first heat exchange medium in the first waste heat recovery chiller 400. The other part of the third heat exchange medium flows to the third branch line 323 and then flows to the evaporator 315 through the dehumidification line 350.

Therefore, the heat management device 1a for a vehicle may simultaneously heat and dehumidify the interior of the vehicle by using the waste heat from the electrical component module PE as a heat source in the third heating mode.

The heat management device 1a for a vehicle according to the second embodiment may simultaneously heat and dehumidify the interior of the vehicle by using both the waste heat from the electrical component module PE and the waste heat from the battery B as heat sources in a fourth heating mode. In this case, the fourth heating mode may be a maximum heating/dehumidification mode. In this case, the maximum heating/dehumidification mode may include the maximum heating mode and the dehumidification mode and decrease the humidity of the interior of the vehicle together with the maximum heating mode.

Referring to FIG. 13, in the fourth heating mode, the third heat exchange medium flows to the first branch line 321 by the first 3-way valve 330. Further, the third heat exchange medium flowing along the first branch line 321 flows to all the first waste heat recovery chiller 400, the second waste heat recovery chiller 500, and the evaporator 315 by the first 2-way valve 341 and the second 2-way valve 342.

For example, the first 2-way valve 341 is turned on, and the second 2-way valve 342 is turned on. Therefore, a part of the third heat exchange medium flows to the second branch line 322 and exchanges heat with the first heat exchange medium in the first waste heat recovery chiller 400. Another part of the third heat exchange medium flows to the third branch line 323 and exchanges heat with the second heat exchange medium in the second waste heat recovery chiller 500. Still another part of the third heat exchange medium flows to the third branch line 323 and then flows to the evaporator 315 through the dehumidification line 350.

Therefore, the heat management device 1a for a vehicle may simultaneously heat and dehumidify the interior of the vehicle by using the waste heat from the electrical component module PE and the waste heat from the battery B as heat sources in the fourth heating mode.

The heat management device 1a for a vehicle may heat the interior of the vehicle by using the third heat exchange medium passing through the external heat exchanger 313.

Figure 14:
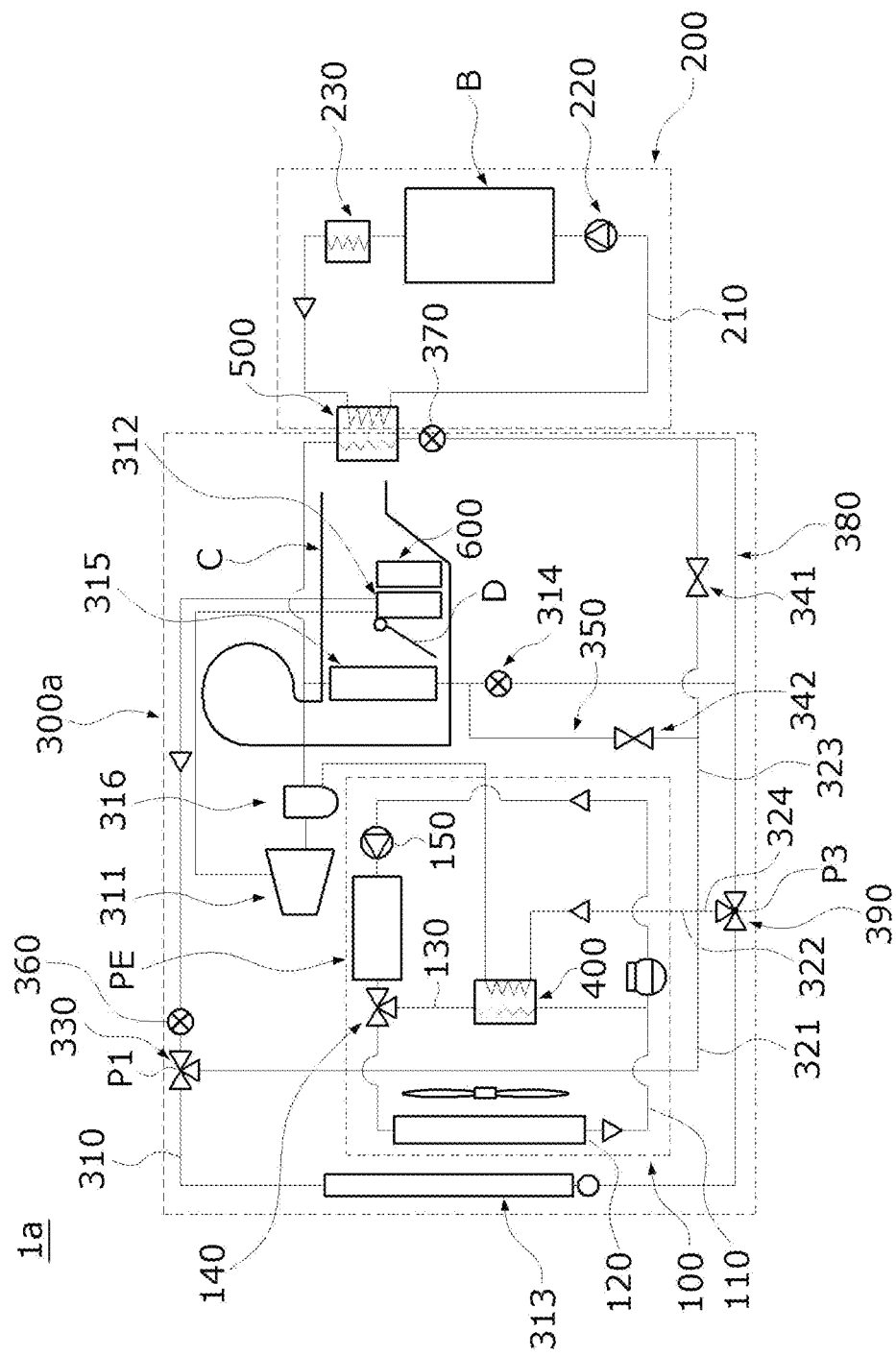
FIG. 14 is a view illustrating a modified example of the heat management device for a vehicle according to the second embodiment.
Figure 15:
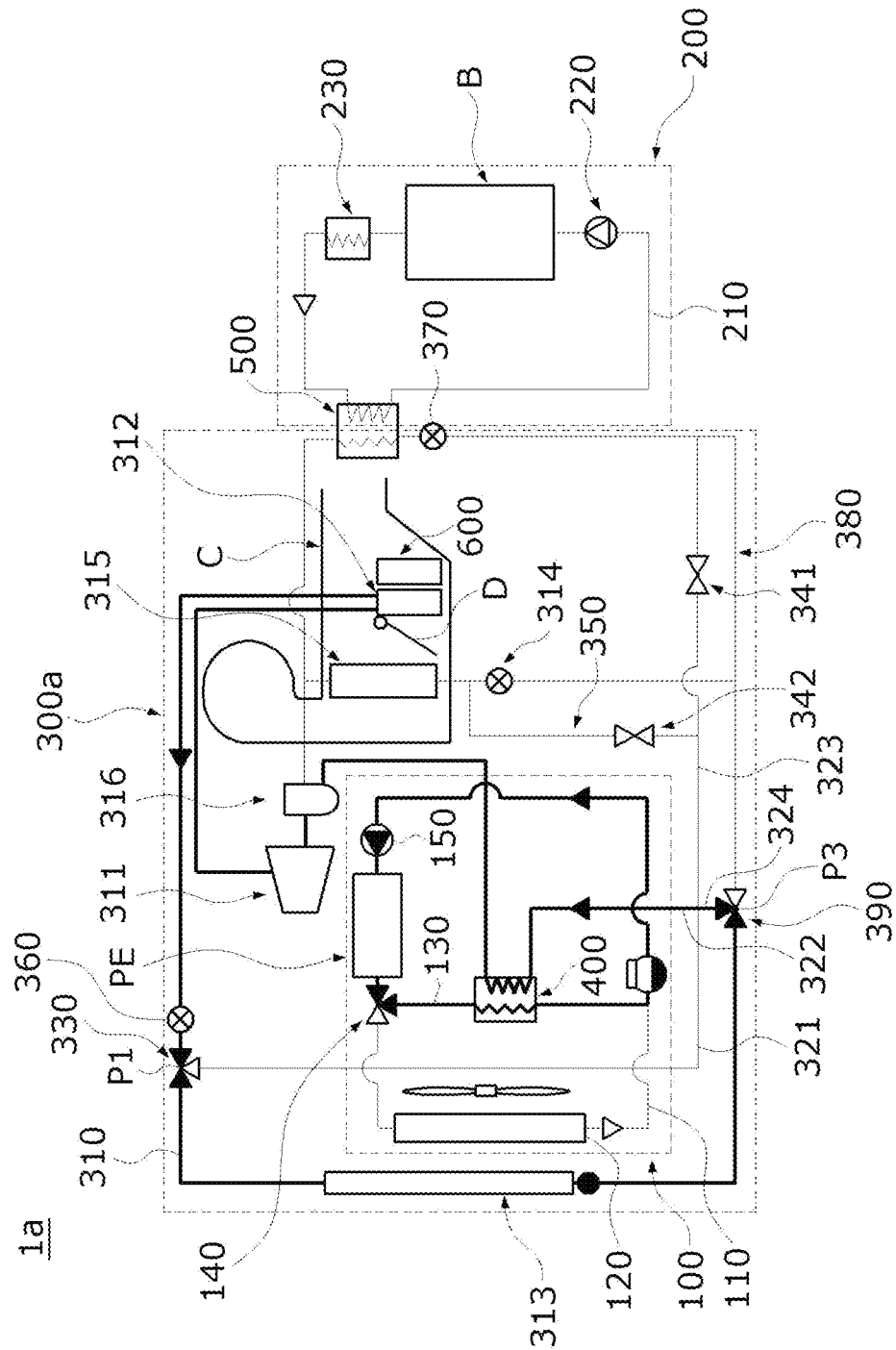
FIG. 15 is a view illustrating a first-first heating mode of the heating mode of the heat management device for a vehicle according to the second embodiment.

FIG. 14 is a view illustrating a modified example of the heat management device for a vehicle according to the second embodiment, and FIG. 15 is a view illustrating a first-first heating mode of the heating mode of the heat management device for a vehicle according to the second embodiment.

Referring to FIG. 14, the heat management device 1a for a vehicle may further include a fifth branch line 324 and a third 3-way valve 390. Therefore, the flow control means of the heat management device 1a for a vehicle may further include the third 3-way valve 390.

The fifth branch line 324 may branch off from the air conditioning line 310 between the external heat exchanger 313 and the first expansion means 314 and connect the second branch line 322.

The third 3-way valve 390 may be disposed at a third branch point P3 at which the air conditioning line 310 and the fifth branch line 324 meet between the external heat exchanger 313 and the first expansion means 314.

Therefore, the third heat exchange medium passing through the external heat exchanger 313 may flow to the first waste heat recovery chiller 400 by the third 3-way valve 390, thereby heating the interior of the vehicle.

Therefore, the heat management device 1a for a vehicle further including the fifth branch line 324 and the third 3-way valve 390 may implement the cooling mode and the first to fourth heating mode and additionally implement a first-first heating mode which is a modified mode of the first heating mode.

The heat management device 1a for a vehicle according to the second embodiment may heat the interior of the vehicle by using the waste heat from the electrical component module PE as a heat source in the first-first heating mode. In this case, the first-first heating mode may be a partial heating mode.

In comparison between the first heating mode and the first-first heating mode of the heat management device 1a for a vehicle, the first heating mode differs from the first-first heating mode in that the heat exchange medium heats the interior of the vehicle while bypassing the external heat exchanger 313 and the heat management device 1 for a vehicle operates in the state in which moisture is attached to the external heat exchanger 313 or the outside atmospheric temperature is very low.

Referring to FIG. 15, in the first-first heating mode, the third heat exchange medium flows to the external heat exchanger 313 by the first 3-way valve 330. Further, the third heat exchange medium passing through the external heat exchanger 313 flows sequentially through the third 3-way valve 390, the fifth branch line 324, and the second branch line 322 and exchanges heat with the first heat exchange medium in the first waste heat recovery chiller 400. In this case, the first 2-way valve 341 and the second 2-way valve 342 may prevent the third heat exchange medium from flowing to the third branch line 323.

A heat management method for a vehicle according to the second embodiment refers to a control method of cooling, heating, and dehumidifying/heating the interior of the vehicle by using the heat management device 1a for a vehicle according to the second embodiment.

The heat management method for a vehicle according to the second embodiment may include a step of selecting the mode, and a step of cooling or heating the interior of the vehicle. In this case, depending on the modes, the step of heating the interior of the vehicle may include a partial heating step, a maximum heating step, a partial heating/dehumidification step, and a maximum heating/dehumidification step.

When the cooling mode (A/C mode) is selected in the step of selecting the mode, the heat management device 1a for a vehicle may perform the cooling step of cooling the interior of the vehicle.

Referring to FIG. 9, the cooling step may lower the temperature of the interior of the vehicle to a temperature lower than an outside temperature by circulating the third heat exchange medium along the compressor 311, the heat dissipation unit 312, the external heat exchanger 313, the expansion means 314, the evaporator 315, and the accumulator 316. In this case, the third heat exchange medium may pass through the second waste heat recovery chiller 500 through the fourth branch line 380 and flow to the accumulator 316. Therefore, the battery cooling device 200 may cool the battery B by using the second heat exchange medium that exchanges heat in the second waste heat recovery chiller 500.

When the first heating mode, which is the partial heating mode of the heating mode (H/P mode), selected in the step of selecting the mode, the heat management device 1a for a vehicle may perform the partial heating step of heating the interior of the vehicle by using the waste heat from the electrical component module PE as a heat source.

Referring to FIG. 10, the partial heating step may heat the interior of the vehicle by using the waste heat from the electrical component module PE as a heat source. For example, in the partial heating step, the third heat exchange medium flows to the first branch line 321 by the first 3-way valve 330, and the third heat exchange medium flowing along the first branch line 321 flows to the second branch line 322 by the first 2-way valve 341 and the second 2-way valve 342 and exchanges heat with the first heat exchange medium in first waste heat recovery chiller 400, thereby heating the interior of the vehicle.

When the second heating mode, which is the maximum heating mode of the heating mode (H/P mode), is selected in the step of selecting the mode, the heat management device 1a for a vehicle may perform the maximum heating step that heats the interior of the vehicle by using both the waste heat from the electrical component module PE and the waste heat from the battery B as heat sources.

Referring to FIG. 11, the maximum heating step may heat the interior of the vehicle by using the waste heat from the electrical component module PE and the waste heat from the battery B as heat sources. For example, in the maximum heating step, the third heat exchange medium flows to the first branch line 321 by the first 3-way valve 330, and the third heat exchange medium flowing along the first branch line 321 flows to both the first waste heat recovery chiller 400 and the second waste heat recovery chiller 500 by the first 2-way valve 341 and the second 2-way valve 342, thereby heating the interior of the vehicle.

When the third heating mode, which is the partial heating/dehumidification mode of the heating mode (H/P mode), is selected in the step of selecting the mode, the heat management device 1a for a vehicle may perform the partial heating/dehumidification step that heats the interior of the vehicle, and at the same time, decreases the humidity of the interior of the vehicle by using the waste heat from the electrical component module PE.

Referring to FIG. 12, the partial heating/dehumidification step may heat the interior of the vehicle, and at the same time, decrease the humidity of the interior of the vehicle by using the waste heat from the electrical component module PE as a heat source. For example, in the partial heating/dehumidification step, the third heat exchange medium flows to the first branch line 321 by the first 3-way valve 330, and the third heat exchange medium flowing along the first branch line 321 flows to both the first waste heat recovery chiller 400 and the evaporator 315 by the first 2-way valve 341 and the second 2-way valve 342, thereby simultaneously heating and dehumidifying the interior of the vehicle.

When the fourth heating mode, which is the maximum heating/dehumidification mode of the heating mode (H/P mode), is selected in the step of selecting the mode, the heat management device 1a for a vehicle may perform the maximum heating/dehumidification step that heats the interior of the vehicle, and at the same time, decreases the humidity of the interior of the vehicle by using the waste heat from the electrical component module PE and the waste heat from the battery B.

Referring to FIG. 13, the maximum heating/dehumidification step may heat the interior of the vehicle, and at the same time, decrease the humidity of the interior of the vehicle by using the waste heat from the electrical component module PE and the waste heat from the battery B as heat sources. For example, in the maximum heating/dehumidification step, the third heat exchange medium flows to the first branch line 321 by the first 3-way valve 330, and the third heat exchange medium flowing along the first branch line 321 flows to all the first waste heat recovery chiller 400, the second waste heat recovery chiller 500, and the evaporator 315 by the first 2-way valve 341 and the second 2-way valve 342, thereby simultaneously heating and dehumidifying the interior of the vehicle.

Referring to FIG. 15, the partial heating step may heat the interior of the vehicle by using the waste heat from the electrical component module PE as a heat source. For example, in the partial heating step, the third heat exchange medium flows to the external heat exchanger 313 by the first 3-way valve 330, and the third heat exchange medium passing through the external heat exchanger 313 flows to the second branch line 322 by the third 3-way valve 390 and the fifth branch line 324 and exchanges heat with the first heat exchange medium in the first waste heat recovery chiller 400. In this case, the first 2-way valve 341 and the second 2-way valve 342 may prevent the third heat exchange medium from flowing to the third branch line 323. Therefore, the interior of the vehicle may be heated.

While the exemplary embodiments of the present disclosure have been described above, those skilled in the art may variously modify and change the present disclosure by adding, changing, deleting, or modifying constituent elements without departing from the spirit of the present disclosure disclosed in the claims, and the modification and change also belong to the scope of the present disclosure.

The invention claimed is:

1. A heat management device for a vehicle, the heat management device comprising:
    a battery cooling device configured to cool a battery by using a second heat exchange medium;
    an air conditioning device configured to adjust a temperature of an interior of a vehicle by using a third heat exchange medium; and
    a second waste heat recovery chiller configured to allow the second heat exchange medium and the third heat exchange medium to exchange heat with each other,
    wherein the air conditioning device comprises:
    an air conditioning line configured to connect a compressor, a heat dissipation unit, an external heat exchanger, a first expansion valve, and an evaporator;
    a branch line connected to the air conditioning line so that the third heat exchange medium bypasses the external heat exchanger; and
    valves,
    wherein the valves perform control so that the third heat exchange medium flows to the evaporator or the second waste heat recovery chiller through the branch line,
    wherein the branch line comprises a first branch line connected to the air conditioning line, a second branch line branching off from the first branch line and disposed to pass through the first waste heat recovery chiller, and a third branch line branching off from the first branch line and disposed to pass through the second waste heat recovery chiller, and
    wherein the valves comprise a first 3-way valve disposed at a first branch point P1 at which the air conditioning line and the first branch line meet and a second 3-way valve disposed in the third branch line.

2. The heat management device of claim 1, further comprising:
    an electrical component cooling device configured to cool an electrical component module by using a first heat exchange medium; and
    a first waste heat recovery chiller configured to allow the first heat exchange medium and the third heat exchange medium to exchange heat with each other,
    wherein the valves perform control so that the third heat exchange medium flows to the first waste heat recovery chiller through the branch line.

3. The heat management device of claim 1, wherein one side of the first branch line is connected to the air conditioning line between the heat dissipation unit and the external heat exchanger.

4. The heat management device of claim 1, wherein the air conditioning device further comprises a dehumidification line branching off from the third branch line and connected to the air conditioning line between the first expansion valve and the evaporator, and
    wherein the second 3-way valve is disposed at a second branch point P2 at which the dehumidification line and the third branch line meet.

5. The heat management device of claim 1, wherein the air conditioning device further comprises:
- a fifth branch line branching off from the air conditioning line between the external heat exchanger and the first expansion valve and connected to the second branch line; and
- a third 3-way valve disposed at a third branch point P3 at which the air conditioning line and the fifth branch line meet.

6. The heat management device of claim 1, wherein the second branch line and the third branch line are connected to an accumulator disposed at an inlet side of the compressor.

7. The heat management device of claim 1, wherein the air conditioning device further comprises a second expansion valve disposed at an inlet side of the first 3-way valve based on a flow of the third heat exchange medium.

8. The heat management device of claim 1, wherein the air conditioning device further comprises a fourth branch line branching off from the air conditioning line between the external heat exchanger and the first expansion valve means and connected to the third branch line.

9. The heat management device of claim 8, wherein the air conditioning device further comprises a third expansion valve disposed at an inlet side of the second waste heat recovery chiller based on a flow of the third heat exchange medium.

10. The heat management device of claim 9, wherein the first expansion valve is a mechanical expansion valve, and the third expansion valve is an electronic expansion valve.

11. A heat management device for a vehicle, the heat management device comprising:
- a battery cooling device configured to cool a battery by using a second heat exchange medium;
- an air conditioning device configured to adjust a temperature of an interior of a vehicle by using a third heat exchange medium; and
- a second waste heat recovery chiller configured to allow the second heat exchange medium and the third heat exchange medium to exchange heat with each other,
wherein the air conditioning device comprises:
- an air conditioning line configured to connect a compressor, a heat dissipation unit, an external heat exchanger, a first expansion valve, and an evaporator;
- a branch line connected to the air conditioning line so that the third heat exchange medium bypasses the external heat exchanger; and
- valves,
wherein the valves perform control so that the third heat exchange medium flows to the evaporator or the second waste heat recovery chiller through the branch line,
wherein the branch line comprises
- a first branch line connected to the air conditioning line,
- a second branch line branching off from the first branch line and disposed to pass through the first waste heat recovery chiller, and
- a third branch line branching off from the first branch line and disposed to pass through the second waste heat recovery chiller, and
wherein the valves comprise
- a first 3-way valve disposed at a first branch point P1 at which the air conditioning line and the first branch line meet and
- a first 2-way valve disposed in the third branch line.

12. The heat management device of claim 11, wherein one side of the first branch line is connected to the air conditioning line between the heat dissipation unit and the external heat exchanger.

13. The heat management device of claim 12, wherein the air conditioning device further comprises:
- a dehumidification line branching off from the third branch line and connected to the air conditioning line between the first expansion valve and the evaporator; and
- a second 2-way valve disposed in the dehumidification line.

14. The heat management device of claim 13, wherein the air conditioning device further comprises:
- a fifth branch line branching off from the air conditioning line between the external heat exchanger and the first expansion valve and coupled to the second branch line; and
- a third 3-way valve disposed at a third branch point P3 at which the air conditioning line and the fifth branch line meet.

15. A heat management device for a vehicle, the heat management device comprising:
- an electrical component cooling device capable of cooling an electrical component module PE;
- a battery cooling device capable of cooling a battery B;
- an air conditioning device configured to adjust a temperature of the interior of the vehicle;
- a first waste heat recovery chiller configured to allow a first heat exchange medium of the electrical component cooling device and a third heat exchange medium of the air conditioning device to exchange heat with each other; and
- a second waste heat recovery chiller configured to allow a second heat exchange medium of the battery cooling device and the third heat exchange medium of the air conditioning device to exchange heat with each other,
wherein the air conditioning device comprises:
- an air conditioning line configured to connect a compressor, a heat dissipation unit, an external heat exchanger, a first expansion means, and an evaporator;
- a branch line branching off from the air conditioning line between the heat dissipation unit and the external heat exchanger and disposed to pass through the first waste heat recovery chiller and the second waste heat recovery chiller;
- a dehumidification line connected to the air conditioning line between the first expansion means and the evaporator and branching off from a third branch line of the branch line disposed to pass through the second waste heat recovery chiller; and
- a flow control means, and
wherein the flow control means controls the third heat exchange medium to use heat of at least any one of the electrical component cooling device and the battery cooling device as a heat source.

16. The heat management device of claim 15, wherein the first heat exchange medium and the second heat exchange medium are coolants, and the third heat exchange medium is a refrigerant.

* * * * *